(12) United States Patent
Doi

(10) Patent No.: US 6,169,563 B1
(45) Date of Patent: Jan. 2, 2001

(54) IMAGE RECORDING APPARATUS HAVING A PLURALITY OF LASER DIODES

(75) Inventor: Masato Doi, Hino (JP)

(73) Assignee: Konica Corporation, Tokyo (JP)

( * ) Notice: Under 35 U.S.C. 154(b), the term of this patent shall be extended for 0 days.

(21) Appl. No.: 09/315,378

(22) Filed: May 18, 1999

(30) Foreign Application Priority Data

May 21, 1998 (JP) .................................. 10-139916
May 28, 1998 (JP) .................................. 10-147562

(51) Int. Cl.$^7$ ..................................... B41J 2/437
(52) U.S. Cl. ..................... 347/236; 347/237; 347/133; 250/370.15
(58) Field of Search ...................... 347/236, 237, 347/238, 246, 247, 253, 232, 240, 133; 358/296; 250/346, 370.15

(56) References Cited

U.S. PATENT DOCUMENTS 5,365,258 * 11/1994 Murata et al. ..................... 347/232
5,696,594 * 12/1997 Saito et al. ........................ 358/296
5,699,103 * 12/1997 Fleming ........................... 347/240

* cited by examiner

*Primary Examiner*—N. Le
*Assistant Examiner*—Hai C. Pham
(74) *Attorney, Agent, or Firm*—Frishauf, Holtz, Goodman, Langer & Chick, P.C.

(57) ABSTRACT

In an image recording apparatus provided with an optical unit having a plurality of laser diodes; a driving circuit is provided to drive the plurality of laser diodes in accordance with image output signals applied with a predetermined first bias; and a beam intensity measuring element is provided to measure a beam intensity of each of beams emitted from the plurality of laser diodes. When the beam intensity measuring element measures the beam intensity of each of beams emitted from the plurality of laser diodes, the driving circuit switches the first bias applied to at least one of the plurality of laser diodes to a second bias smaller than the first bias.

12 Claims, 17 Drawing Sheets

IMAGE RECORDING APPARATUS HAVING A PLURALITY OF LASER DIODES

BACKGROUND OF THE INVENTION

This invention relates to an image recording apparatus for recording an image, and in particular, to an image recording apparatus suitable for a proof making apparatus (Direct Digital Color Proof: DDCP) outputting color proofs (a sample for proofreading) with a halftone dot image.

In making color printed matters, in some cases it is performed at the stage of original films color proofreading, in which color proofs are prepared using each of the color-separated halftone dot original films which are separated into a Y-print, an M-print, a C-print, and a BK-print (black or India ink color), so that it may be checked if there is no mistake in the layout of the original films, no mistake in the colors, no mistake in the letters, and so forth, to confirm the finish of the prints before final printing plates are prepared on the basis of the color-separated halftone dot original films.

In recent years, the preparation of color proofs has been carried out using the DDCP (direct digital color proof) method. As one of the techniques in the DDCP method, a silver halide photosensitive material is exposed to a light beam composed of a combination of a plurality of lights having different wavelengths such as R, G, and B to make the dots for the respective colors Y, M, C, and BK develop colors, on the basis of the halftone clot image data of the respective color-separated halftone dot originals.

As a technique other than the DDCP method, there is known technique in which color proofs are prepared by transferring images of the respective colors through the ink pigment transfer process from the respective ink sheets of Y, M, C, and BK onto the same kind of paper sheets as used in printing.

The development of colors in the respective dots for Y, M, C, and BK in printing is determined by the colors of inks of the respective colors. On the other hand, in a silver halide color photosensitive material, the development of colors in the respective dots for Y, M, C, and BK determined by the color development in the photosensitive layers. That is, in a silver halide color photosensitive material, the development of colors in the photosensitive layers is determined by the light emission quantity of the recording light source.

As the above-mentioned recording light source, there has been known a light source using a plurality of laser beams in order to make the recording speed high. As for the laser beams, it is often the case to use a gas laser; and further, in the method of obtaining a plurality of laser beams, a beam splitting optical element has been used.

In recent years, from the view point of cost reduction and owing to the stability established for laser diodes, there has been brought into practice a method in which a plurality of laser beams are formed by arranging a requires number of elements of laser diodes.

The modulation speed of each laser diode has been suppressed at a low level as a result of using plural diodes in view of the transmitting speed of the image data. On the other hand, for the purpose of recording an image with a stable quality, correction has been carried out for the decrease of emission intensity owing to the deterioration of laser diodes with the passage of time, or for the decrease of the beam intensity of the laser beam reaching to the photosensitive material through the optical system.

In the future, it is thinkable that the transmission speed of image data will be improved with the progress of technology, and it is easily judged that the increase of the recording speed in image recording will be required more and more. On this occasion, it will be necessary to make the modulation speed of laser diodes high, and in order to secure a high response speed, it will be required to keep the laser diodes in the state of emitting light at a low level (by applying a bias voltage) even when the image data of pixels for the laser diodes does not form a dot image during image recording period.

However, it raises a problem that, in correcting beam intensity, if each of the laser diodes is always in the light emitting state at a low level, measurement of beam intensity with a high precision can not be made owing to the influence of the light leakage from a laser diode among a plurality of laser diodes other than the target laser diode which is the object of correction, and the precision of correction is made to be lowered.

Further, in conventional image recording apparatus, it has been made a practice that an initial operation of every portion of the apparatus is performed after turning on the power source, and the control of the light emission quantity of the recording light source is carried out at the timing when the initial operations are finished.

The above sequence is shown schematically in FIG. 20. The abscissa is the passed time t after the turning-on of the power source and the ordinate is the light emission intensity P of a semiconductor laser. The light emission intensity gets increased after the turning-on of the power source and enters in a nearly stable state after the light emission intensity reaches to the maximum value.

Regardless of this light emission characteristic, in conventional general image recording apparatus, it has been made a practice that the light emission intensity is measured at the timing when the initial operations of the apparatus are finished, and the driving current is adjusted so as to obtain a predetermined light emission intensity. For example, this timing when the initial operations are finished corresponds to t1 in the case of FIG. 20.

However, as shown in FIG. 20, the light emission intensity reaches to the maximum value after the turning-on of the power source, and enters into the nearly stable state after decreasing by a certain quantity. Accordingly, if the adjustment of the light emission intensity is carried out in the neighborhood of the maximum value, the light emission quantity is made to be decreased from several per cent to 10% when the laser diode is brought into the state of actual use.

Further, owing to the atmosphere of the environment where the image recording apparatus is used, sometimes the temperature in the neighborhood of the light source varies. In such a case too, the light emission intensity of the recording light source varies. Moreover, when the temperature in the neighborhood of the light source varies, deviation occurs in the optical system such as a lens and a mirror, the deviation also being produced in the optical axis and the focus, resulting in the variation of the beam intensity, and further, in the variation of the light quantity used in image recording.

Further, lately, some image recording apparatus are continuously used for 24 hours without stopping. In such cases, the apparatus are continuously used with the light emission intensity adjusted only once at the time of turning-on of the power source. As a result, there is a high possibility that the light emission intensity will enter a state that is different from that at the time of its adjustment.

As stated in the above, if the light emission intensity of the recording light source varies, the desired range of variation of the light emission intensity (for example, to the extent of 2 to 3%) can not be maintained, and high-fidelity color proofs are difficult to prepare.

SUMMARY OF THE INVENTION

This invention has been made in view of the above-mentioned problems, and it an object of this invention is to provide an image recording apparatus using a plurality of laser diodes, wherein high-speed writing is possible and wherein measurement of the beam intensity of each of said laser diodes can be performed with a high precision. Further, it is another object of the invention to provide an image recording apparatus having a laser diode, wherein correction of the beam intensity of each of said laser diodes can be performed with a high precision.

The above-described objects are accomplished by the following structures.

I. An image recording apparatus, comprises
  an optical unit having a plurality of laser diodes;
  a driving circuit to drive the plurality of laser diodes in accordance with image output signals applied with a predetermined first bias; and
  a beam intensity measuring element to measure a beam intensity of each of beams emitted from the plurality of laser diodes;
  wherein when the beam intensity measuring element measures the beam intensity of each of beams emitted from the plurality of laser diodes, the driving circuit switches the first bias applied to at least one of the plurality of laser diodes to a second bias smaller than the first bias.

II. An image recording apparatus, comprising:
  an optical unit having a laser diode and a beam optical system to guide a laser beam emitted from the laser diode to a recording material;
  a beam intensity measuring element to measure a beam intensity of the beam emitted from the laser diode; and
  control means for controlling the beam intensity measuring elements so as to measure the beam intensity of the laser beam after a predetermined warm-up process has been completed and for adjusting the intensity of the laser beam of the laser diode based on the measured beam intensity, the control means changeably setting timing at which the warm-up process is conducted.

III. An image recording apparatus, comprising:
  an optical unit having a laser diode and a beam optical system to guide a laser beam emitted from the laser diode to a recording material;
  a beam intensity measuring element to measure a beam intensity of the beam emitted from the laser diode; and
  control means for controlling the beam intensity measuring elements so as to measure the beam intensity of the laser beam at every time when a predetermined time period has elapsed while the image recording apparatus is working and for adjusting the intensity of the laser beam of the laser diode based on the measured beam intensity, the control means changeably setting the predetermined time period.

IV. An image recording apparatus, comprising:
  an optical unit having a laser diode and a beam optical system to guide a laser beam emitted from the laser diode to a recording material;
  a beam intensity measuring element to measure a beam intensity of the beam emitted from the laser diode;
  temperature measuring means for measuring a temperature at a position located at or close to the optical unit; and
  control means for controlling the beam intensity measuring elements so as to measure the beam intensity of the laser beam in accordance with the temperature measured by the temperature measuring means and for adjusting the intensity of the laser beam of the laser diode based on the measured beam intensity.

Further, the above-described objects are accomplished by any one of the apparatus stated in the following as preferable embodiment:

(1) A method of correcting beam intensity in a image recording apparatus in which, in the light source portion composed of a plurality of laser diodes, a bias voltage is applied to each of said plurality of laser diodes and image data are simultaneously recorded on a recording medium through the irradiation by a plurality of beams, wherein, during the period of correcting the beam intensity of each of said laser diodes, said bias voltage applied to the plural laser diodes other than the object of correction is switched to the state of no bias, the beam intensity of the correction object laser diode is measured by driving said correction object laser diode at a predetermined light emission level, and the beam intensity of each of said plurality of laser diodes in recording an image is corrected on the basis of the result of said measurement of the beam intensity.

(2) An image recording apparatus comprising a light source portion composed of a plurality of laser diodes, means for applying a bias voltage which applies a bias voltage to each of laser diodes of said light source portion, bias switching means for switching said bias voltage from a biased state to an unbiased state, beam intensity measuring means for measuring the beam intensity of a laser diode, and beam intensity correcting means for correcting the beam intensity of each of laser diodes on the basis of the result of said measurement of the beam intensity, wherein, during the period of correcting the beam intensity of each of laser diodes, said bias voltage applied to a plurality of laser diodes other than the object of correction is switched to the unbiased state, the correction object laser diode being driven at a predetermined light emission level, the beam intensity of said correction object laser diode is measured, and the beam intensity of said each of laser diodes in recording an image is corrected on the basis of the result of said measurement of the beam intensity; and during the period of writing an image by a plurality of laser diodes, said bias voltage applied to said plurality of laser diodes is switched to a biased state, and writing an image is carried out with the laser diodes made to emit light at a low level even in the state for the laser diodes not to write data in a pixel.

(3) A method of correcting beam intensity in a image recording apparatus in which, in the light source portion composed of a plurality of laser diodes, a bias voltage is applied to each of said plurality of laser diodes and image data are simultaneously recorded on a recording medium through the irradiation by a plurality of beams, wherein, during the period of correcting the beam intensity of each of said laser diodes, the light emission level during a period not to write data in a pixel is switched over in a manner such that said bias voltage applied to the laser diodes other than the object of correction is made to be in an unbiased state and the correction object laser diode is driven at a predetermined light emission level, the beam intensity of said correction object laser diode being measured, and the beam intensity of each of the laser diodes in recording an image is corrected on the basis of the result of said measurement of the beam intensity.

(4) An image recording apparatus comprising a light source portion composed of a plurality of laser diodes, means for applying a bias voltage which applies a bias voltage to each of laser diodes of said light source portion, emission level setting means capable of setting the light emission level during a period to write data in a pixel and that during a period not to write data in a pixel for said plurality of laser diodes, bias switching means for switching over said bias voltage between a biased state and an unbiased state changing said light emission level during a period not to write data in a pixel, beam intensity measuring means for measuring the beam intensity of said plurality of laser diodes, and beam intensity correcting means for correcting the beam intensity of said plurality of laser diodes on the basis of the result of said measurement of the beam intensity, wherein, during the period of correcting the beam intensity of each of laser diodes, the light emission level during a period not to write data in a pixel is switched over in a manner such that said bias voltage applied to the plural laser diodes other than the object of correction is made to be an unbiased state and, the correction object laser diode being driven at a predetermined light emission level, the beam intensity of said correction object laser diode is measured, and the beam intensity of said plural laser diodes in recording an image is corrected on the basis of the result of said measurement of the beam intensity; and during the period of writing an image by a plurality of laser diodes, writing data in a pixel is carried out with the light emission level set to a level of low light emission even in the state for said plurality of laser diodes not to write data in a pixel.

(5) An image recording apparatus comprising an optical system for focusing a laser beam from a recording light source on a recording medium, intensity measuring means for measuring the intensity of said laser beam from said recording light source, scanning means for scanning said recording medium surface by said laser beam focused by said optical system, and control means for adjusting the intensity of said laser beam from said recording light source by measuring the intensity of said laser beam by said intensity measuring mean after the initial operations and the predetermined warming-up process of the image recording apparatus are finished.

According to this invention of an image recording apparatus, the intensity of the laser beam is adjusted by measuring the intensity of the laser beam by intensity measuring means after the initial operations and the predetermined warming-up process are finished; hence, the timing when the light emission intensity of the recording light source is unstable can be avoided, and it becomes possible for the recording light source to keep the light emission of the predetermined intensity.

(6) An image recording apparatus set forth in the paragraph (5), wherein the aforesaid control means has a structure capable of setting and changing the time period for said warming-up process.

According to this invention of an image recording apparatus, it is possible to set and change over the time period for the predetermined warming-up process after the initial operation; hence, the timing for carrying out the adjustment of the light emission intensity can be set in accordance with the environment of using, the use, and the characteristics of the light source.

(7) An image recording apparatus comprising an optical system for focusing a laser beam from a recording light source on a recording medium, intensity measuring means for measuring the intensity of said laser beam from said recording light source, scanning means for scanning said recording medium surface by said laser beam focused by said optical system, and control means for adjusting the intensity of said laser beam from said recording light source by measuring the intensity of said laser beam by said intensity measuring means, every time after the passage of a predetermined time during the operation of the image recording apparatus.

According to this invention of an image recording apparatus, the intensity of the laser beam from the recording light source is adjusted by measuring the intensity of the laser beam by intensity measuring means every time after the passage of a predetermined time during the operation of the image recording apparatus; hence, the timing when the light emission intensity of the recording light source is unstable can be avoided, and it becomes possible for the recording light source to keep the light emission of the predetermined intensity for a long time.

(8) An image recording apparatus set forth in the paragraph (7), wherein the aforesaid control means has a structure capable of setting and changing the aforesaid predetermined time for measuring the intensity of said laser beam.

According to this invention of an image recording apparatus, the intensity of the laser beam is measured by intensity measuring means every time after the passage of a predetermined time during the operation of the image recording apparatus, and it is possible for the predetermined time to be set and changed; hence, the timing for carrying out the adjustment of the light emission intensity can be set in accordance with the environment of using, the use, and the characteristics of the light source.

(9) An image recording apparatus comprising an optical system for focusing a laser beam from a recording light source on a recording medium, intensity measuring means for measuring the intensity of said laser beam from said recording light source, temperature measuring means for measuring the temperature in the neighborhood of said recording light source, scanning means for scanning said recording medium surface by said laser beam focused by said optical system, and control means for adjusting the intensity of said laser beam from said recording light source by measuring the intensity of said laser beam by said intensity measuring means, at the timing when said temperature in the neighborhood of said recording light source based on the result of the measurement by said temperature measuring means has reached to a predetermined value.

According to this invention of an image recording apparatus, the intensity of the laser beam from the recording light source is adjusted by measuring the intensity of the laser beam by intensity measuring means at the timing when said temperature in the neighborhood of said recording light source has reached to a predetermined value; hence, it is possible to cope with the deviation of the optical system owing to the variation of the temperature and the temperature-depending drift of the light source, and it becomes possible for the recording light source to keep the light emission of a predetermined intensity.

(10) An image recording apparatus set forth in the paragraph (9), wherein the aforesaid control means has a structure capable of setting and changing the aforesaid predetermined temperature to be measured.

According to this invention of an image recording apparatus, the intensity of the laser beam is measured by intensity measuring means at the timing when the temperature in the neighborhood of the recording light source has reached to a predetermined value during the operation of the image recording apparatus, and it is possible for the predetermined temperature value to be set and changed; hence, the timing for carrying out the adjustment of the light emission intensity can be set in accordance with the environment of using, the use, and the characteristics of the light source.

(11) An image recording apparatus comprising an optical system for focusing a laser beam from a recording light source on a recording medium, intensity measuring means for measuring the intensity of said laser beam from said recording light source, temperature measuring means for measuring the temperature in the neighborhood of said recording light source, scanning means for scanning said recording medium surface by said laser beam focused by said optical system, and control means for adjusting the intensity of said laser beam from said recording light source by measuring the intensity of said laser beam by said intensity measuring means, at the timing when said temperature in the neighborhood of said recording light source based on the result of the measurement by said temperature measuring means has varied by a value equal to or more than a predetermined value.

According to this invention of an image recording apparatus, the intensity of the laser beam from the recording light source is adjusted by measuring the intensity of the laser beam by intensity measuring means at the timing when said temperature in the neighborhood of said recording light source has varied by a value equal to or more than a predetermined value; hence, it is possible to cope with the deviation of the optical system owing to the variation of the temperature and the temperature-depending drift of the light source, and it becomes possible for the recording light source to keep the light emission of the predetermined intensity for a long time.

(12) An image recording apparatus set forth in the paragraph (11), wherein the aforesaid control means has a structure capable of setting and changing the aforesaid temperature variation value in the neighborhood of the recording light source.

According to this invention of an image recording apparatus, the intensity of the laser beam is measured by intensity measuring means at the timing when the temperature in the neighborhood of the recording light source has varied by a value equal to or more than a predetermined value during the operation of the image recording apparatus, and it is possible for the predetermined temperature variation value to be set and changed; hence, the timing for carrying out the adjustment of the light emission intensity can be set in accordance with the environment of using, the use, and the characteristics of the light source.

DETAILED DESCRIPTION OF THE PREFERRED EMBODIMENT

Figure 1:
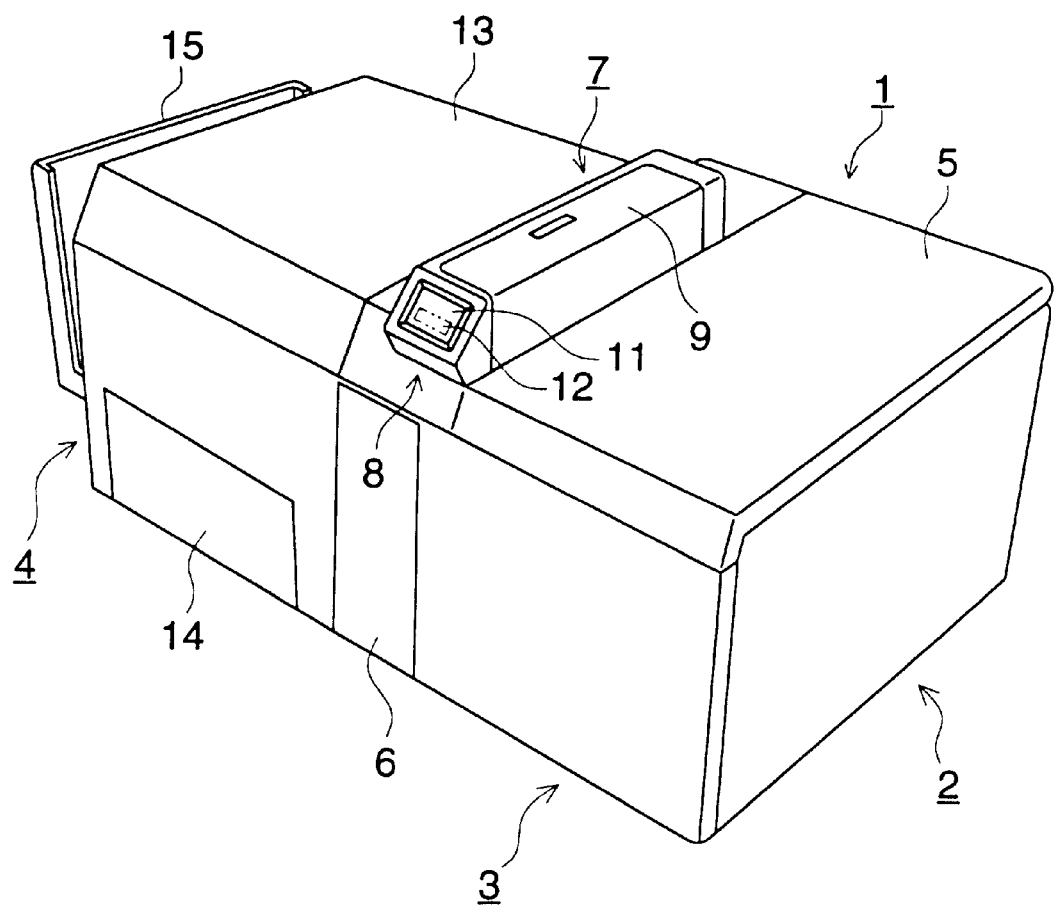
FIG. 1 is a perspective exterior view of an apparatus of an example of the embodiment of this invention.
Figure 2:
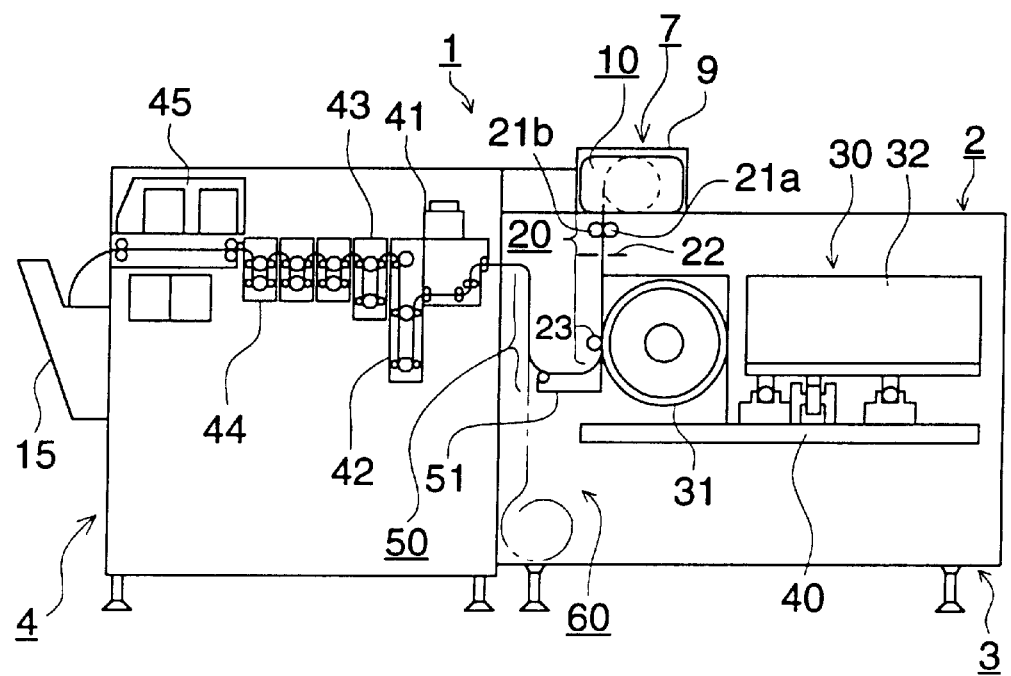
FIG. 2 is a schematic drawing showing the internal structure of an apparatus of an example of the embodiment of this invention.
Figure 3:
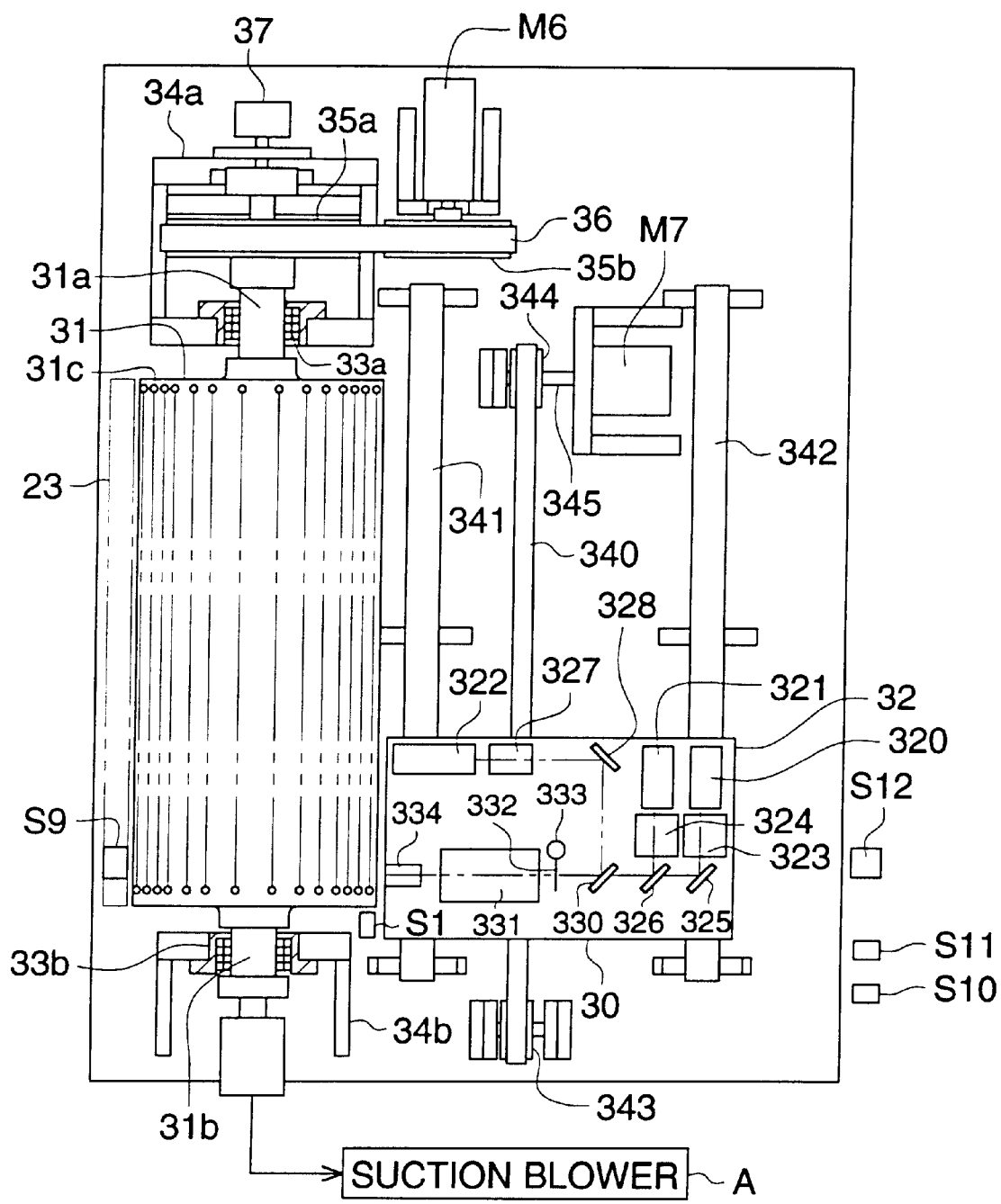
FIG. 3 is a schematic drawing showing a part of the internal structure of an apparatus of an example of the embodiment of this invention.
Figure 4:
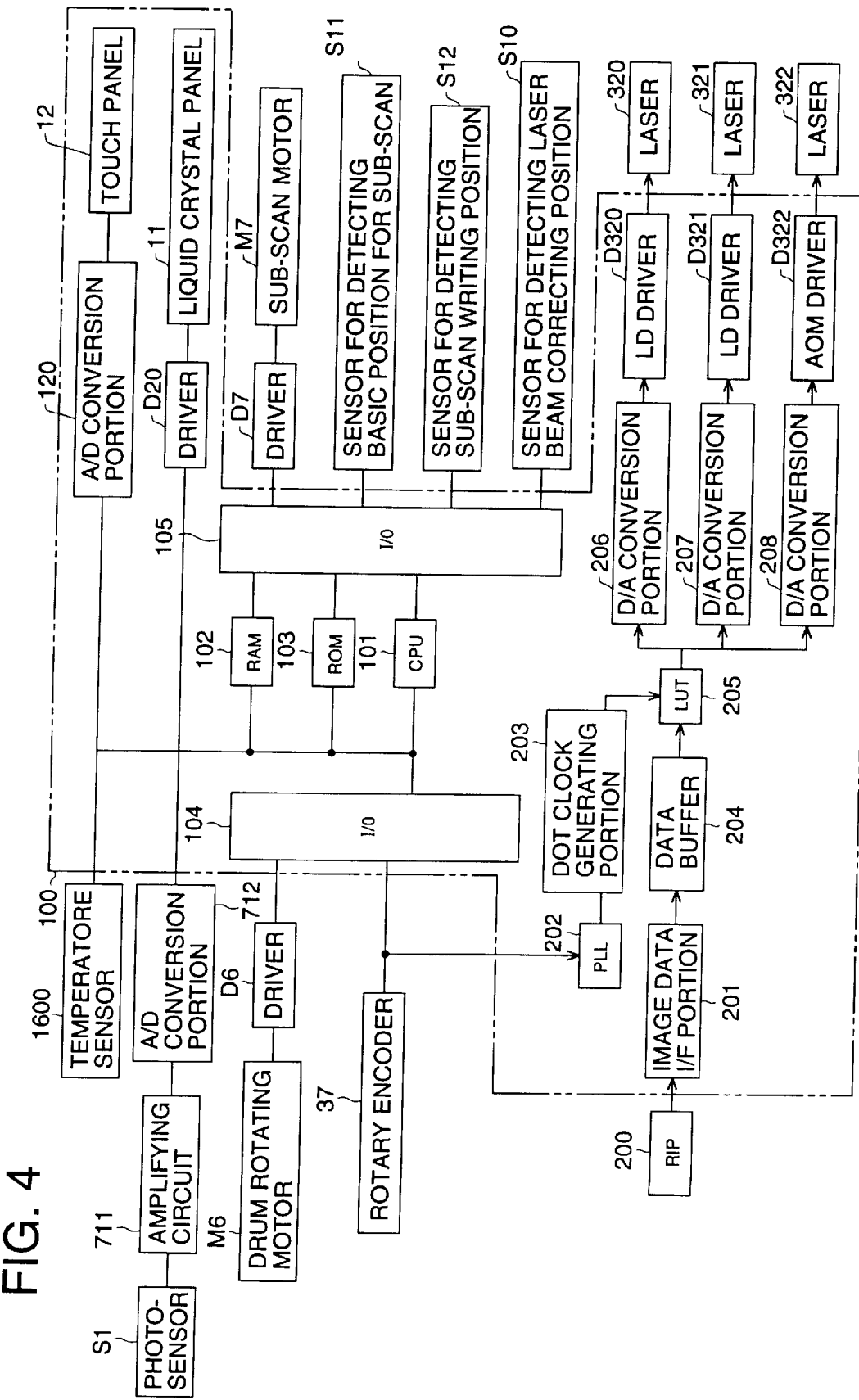
FIG. 4 is a schematic drawing showing the electrical structure of the essential part of an apparatus of an example of the embodiment of this invention.

In the following, an embodiment of this invention will be explained with reference to the drawings. As an example of an image recording apparatus of the present invention, an apparatus for making color proofs will be explained. First, the outline of the structure of the apparatus will be explained. FIG. 1 is a perspective exterior view of an apparatus of an example of the embodiment of this invention, FIG. 2 is a schematic drawing showing the internal structure of an apparatus of an example of the embodiment of this invention, FIG. 3 is a schematic drawing showing a part of the internal structure of an apparatus of an example of the embodiment of this invention, and FIG. 4 is a schematic drawing showing the electrical structure of the essential part of an apparatus of an example of the embodiment of this invention.

As shown in FIG. 1, the apparatus mainframe 2 of the apparatus for making color proofs 1 is equipped with the exposure unit 3 and the developing process unit 4. The exposure unit 3 is provided with the upper panel 5 and the front panel 6 in a way capable of opening and closing, so that maintenance operation may be carried out through the upper side and the front side. On the upper side of the exposure unit 3, there is provided the paper loading portion 7 at the developing portion side, and the operation portion 8 is disposed at the front side of this paper loading portion 7, at the front side of the apparatus mainframe 2. In the paper loading portion 7, there is provided the paper feeding cover 9 in a way capable of opening and closing, and the cartridge 10 receiving a photosensitive material (hereinafter referred to also as a paper) can be set through the paper feeding cover 9. In the operation portion 8, there are provided the liquid crystal panel 11 (the data display portion of this apparatus for displaying data for an operator) and the touch panel 12 (the data input portion of this apparatus for inputting data by an operator).

In the developing process unit 4, there are provided the upper surface panel 13 and the replenishment panel 14 in a way capable of opening and closing, so that maintenance operation may be carried out through the upper surface side and replenishment of the processing liquid may be carried out through the front surface side. At the left side portion of the developing process unit 4, there is provided the paper discharging tray 15, to which the processed photosensitive materials are ejected.

Next, the outline of the structure of the apparatus for making color proofs will be explained with reference to FIG. 2. The exposure unit 3 are equipped with the paper feeding portion 20, the main scan portion 30, the sub-scan portion 40, the paper discharging portion 50, and the accumulation portion 60. In the paper feeding portion 20, there are provided the paper feeding rollers 21a and 21b, the cutter 22, and the drum paper feeding-discharging roller 23. The photosensitive material from the cartridge 10 is taken out by the paper feeding rollers 21a and 21b, cut to the predetermined length by the cutter 22, and is sent to the main scan portion 30 through the drum paper feeding-discharging roller 23.

The main scan portion 30 is equipped with the drum 31 which is capable of rotating, and rotates with the photosensitive material attracted to an outer peripheral surface of the drum 31. The optical unit 32 is disposed opposite to the drum 31, and can be moved parallel to the drum axis by the sub-scan portion 40. The optical unit 32 receives the digital image signal to expose the photosensitive material attracted to the drum 31 to the beams of the plural laser diodes simultaneously for image writing. When an image is recorded, these laser diodes are modulated at a high speed to write an image with a bias current (described later) always applied. Further, for the reasons described later, the apparatus 1 has a structure such that the deterioration with the passage of time of the laser diode light source can be corrected.

The paper discharging portion 50 of the exposure unit 3 is equipped with the detaching guide 51, and the photosensitive material for which writing has been finished, is detached from the drum 31 by this detaching guide 51 and is delivered to the developing process unit 4.

At this time, the discharging transport speed in the exposure unit 3 is faster than the transport speed in the developing process unit 4, the photosensitive material is sent to the accumulating portion 60 with the discharge transport speed kept at a high level as it is, and the photosensitive material is accumulated in the accumulating portion 60, hung down therein, to adjust the transport timing to the developing process unit 4, so that the process capacity of the exposure unit 3 is raised.

The developing process unit 4 is equipped with the second exposure portion 41 (hereinafter, description will be done with regard to an example of a direct positive photosensitive material for reverse exposure), the developing portion 42, the fixing portion 43, the stabilizing portion 44, and the drying portion 45. The second exposure portion 41 conducts the second exposure (the reversal exposure) with the photosensitive material, and the photosensitive material, which has been subjected to the second exposure, is transported to the developing portion 42, the fixing portion 43, and the stabilizing portion 44 successively to be develop-processed; this processed photosensitive material is dried in the drying portion 45 and sent to the paper discharging portion 15.

In the following, the structure of the main scan portion and the sub-scan portion will be explained with reference to FIG. 3. The journal portions 31a and 31b at the both sides of the drum 31 in the main scan portion 30 are supported in a way to be able to rotate by the supporting bases 34a and 34b through the bearings 33a and 33b. At one of the journal portions 31a of the drum 31, the drive pulley 35a is fitted and this drive pulley 35a is connected to the output pulley 35b of the drum rotating motor M6 by the belt 36, and the drum 31 is rotated by the driving of the drum rotating motor M6. Further, the rotary encoder 37 is fixed to one of the journal portions 31a of the drum 31, and outputs rotation-generated pulses to be used for controlling pixel clock in synchronism with the drum rotation.

The other journal portion 31b of the drum 31 is coupled to the suction blower A. The drum 31 is formed of a hollow body, and has attracting holes 31c formed on its outer surface; accordingly, the photosensitive material is attracted to the outer surface of the drum 31 owing to the reduced pressure inside the drum 31 produced by driving the suction blower A.

In the optical unit 32, the plural red laser light sources 320, the plural blue laser light sources 321, and the green laser light source 322 are disposed. The red laser beams from the red laser light sources 320 pass through the beam regulating optical system 323 and the mirror 325, and the blue laser beams from the blue laser light sources 321 pass through the beam regulating optical system 324 and the mirror 326. The green laser beam from the green laser light source 322 passes through the AOM (acousto-optic modulator element) 327 and the mirrors 328 and 330. Further, the red laser beams, the blue laser beams and the green laser beams pass through the reduction lens 331 and the focusing lens 334 respectively and expose the photosensitive material on the drum 31 so as to form an image. The strength rising-up characteristics of emitted beams are improved by letting a bias current flow in the laser diodes. Further, it is made to be possible that the beam intensity of the laser diodes is corrected by the method to be described later with a good precision. The opening and closing of the optical path is carried out at the time of the start of exposure and of the end of exposure by opening and closing the exposure shutter 332 using the exposure solenoid 333. In addition, the laser diode is one type of the laser light sources.

The optical unit 32 is fixed to the moving belt 340, and is arranged in a way capable of moving in the parallel direction to the drum axis, guided by the pair of guide rails 341 and 342. The moving belt 340 is entrained around the pair of pulleys 343 and 344, and the optical unit 32 is moved parallel to the drum axis by the driving of the sub-scan motor M7.

The sensor for detecting the sub-scan basic position S11 of the optical unit 32, the sensor for detecting the sub-scan writing position S12 of the optical unit 32, and the sensor for detecting the laser beam intensity measuring position S10 of the optical unit 32 are arranged in the direction of the drum axis. The optical unit 32 is stopped at the sub-scan basic position detected by the sensor for detecting the sub-scan basic position S11; sub-scan is started from this sub-scan basic position and stopped after the optical unit is moved to a position at a distance corresponding to the image size, and the optical unit is returned to the sub-scan basic position. Further, the optical unit 32 is stopped also at the beam intensity measuring position for the laser beams detected by the laser beam intensity measuring position sensor S10.

Now, the electrical structure of the essential part of this apparatus will be explained with reference to FIG. 4. The control portion 100 comprises the CPU 101, the RAM 102, and the ROM 103, is connected to the sensors and the actuators through the I/O ports 104 and 105, and controls the actuators on the basis of the information from the sensors.

As for the sensors, the sensor for the basic position of the paper leading edge S9, the rotary encoder 37, the sensor for detecting laser beam intensity measuring position S10, the sensor for detecting the sub-scan basic position S11, the sensor for detecting the sub-scan writing position S12, and so forth are connected to the control portion 100. Further, as for the actuators, the drum rotating motor M6, the sub-scan motor M7, and the exposure shutter solenoid 333 and so forth are connected to the control section 100. The sub-scan motor M7 are driven through the driver D7 and the drum rotating motor M6 are driven through the driver D6 by the control of the control section 100 respectively.

Further, regarding the operation portion 8, the liquid panel 11 is controlled through the driver D20 by the control section 100, and displays the state of operation of the apparatus for making color proofs. Moreover, an instruction from the operation of the touch panel 12 is transmitted to the CPU 101 as digital information by the A/D converter 120.

RIP200 is provided to the outside of the apparatus 1 and connected to the apparatus 1. RIP200 produces digital dot image data of Y, M, C, BK in a raster image format from the image data on the basis of which electric plate making is conducted. Digital dot image data of Y, M, C, BK are sent from the RIP 200 to the data buffer 204 through the image data I/F portion 201. In this case, the dot image data of the respective colors (Y, M, C, and BK) produced by the RIP 200 are transmitted to the I/F portion 201, in which the data are converted from the raster image format to the exposure format for the three scanning lines, and the converted image data are stored in the data buffer 204. After the converted image data for one page are stored in the data buffer 204, the exposure for all colors are carried out simultaneously. On the other hand, the digital dot image data in the exposure format are given from the data buffer 204 to the LD drivers D320 and D321 and AOM driver D322 through the LUT (look-up table) 205 and the D/A conversion portions 206, 207 and 208, using the dot clock signal from the dot clock generation portion 203 in synchronism with the output signal from the PLL 202 based on the photosensitive material advancing signal from the rotary encoder 37; the red laser light sources 320, blue laser light sources 321, and the green laser light source 322 are driven by these drivers.

At that time, for each of the minimum writing dots (called pixels) of the laser diodes for exposure, digital image data of Y, M, C, and BK in the exposure format are converted to a combination of the laser beam intensity of R, G, and B designated in LUT 205. The LUT 205 converts the data value of Y, M, C, BK into the intensity of B, G, R in terms of the unit of the pixel in which laser beams from the laser diodes of three wavelengths are superposed on one another.

In this apparatus, for each laser diode, for example, the light emission levels of the R, G, and B lasers are predetermined for each data value of digital image data and memorized in the LUT 205.

Now, the main operation of the apparatus for making color proofs will be explained. When the main switch on the touch panel 12 is turned on, the initial operations of the apparatus are carried out. Next, in the self-diagnosis process, the correction of the beam intensity for each of the lasers is made. After that, the feeding of a photosensitive material and the simultaneous writing on the photosensitive material by the beams of the plural laser diodes are carried out, and when this writing process is finished, development process is done. In addition, the correction of the beam intensity of the lasers can be made from the touch panel 12 at any suitable time.

Figure 5:
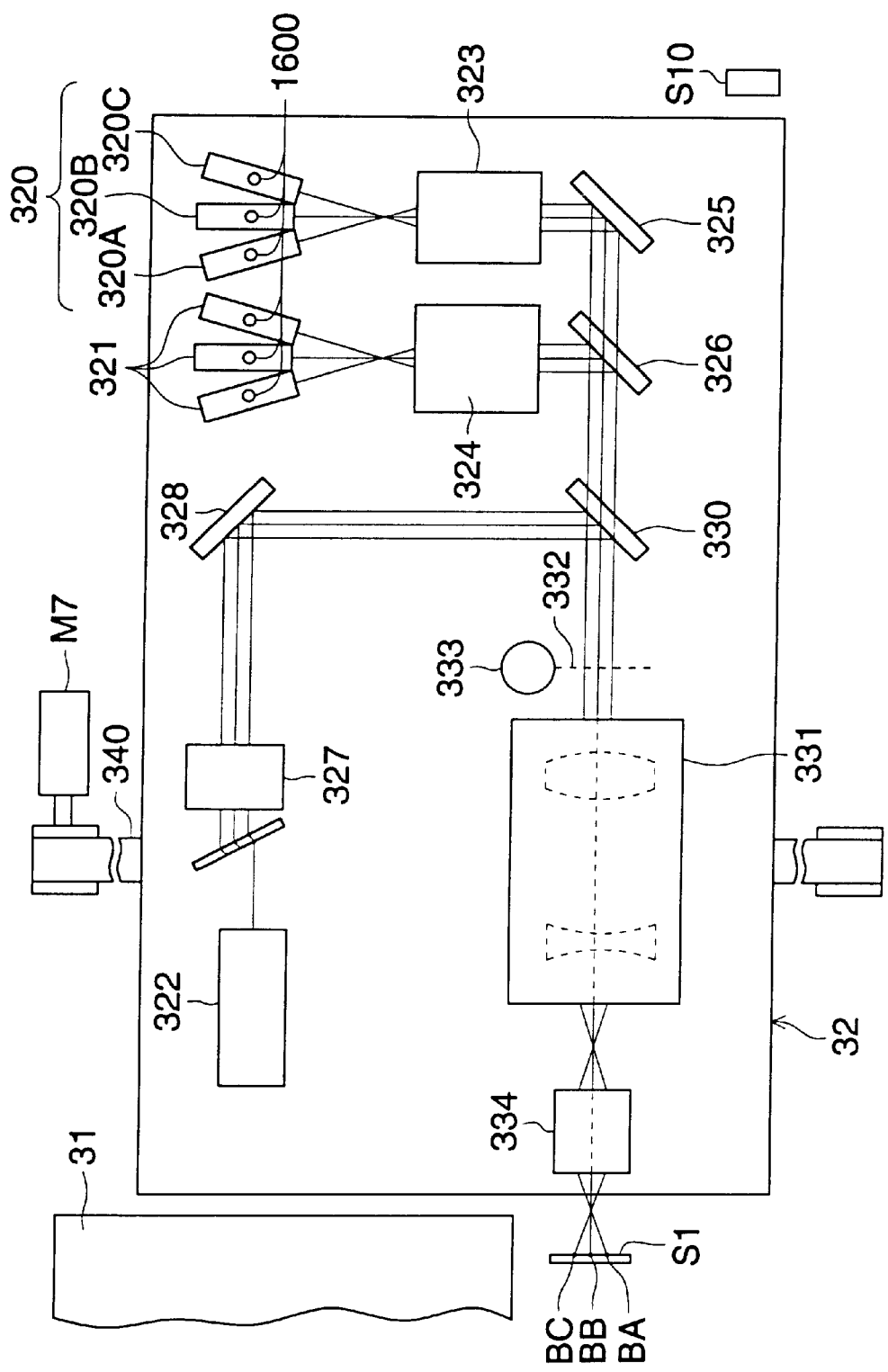
FIG. 5 is a schematic drawing showing a part of the internal structure of the essential part of an apparatus of an example of the embodiment of this invention.
Figure 6:
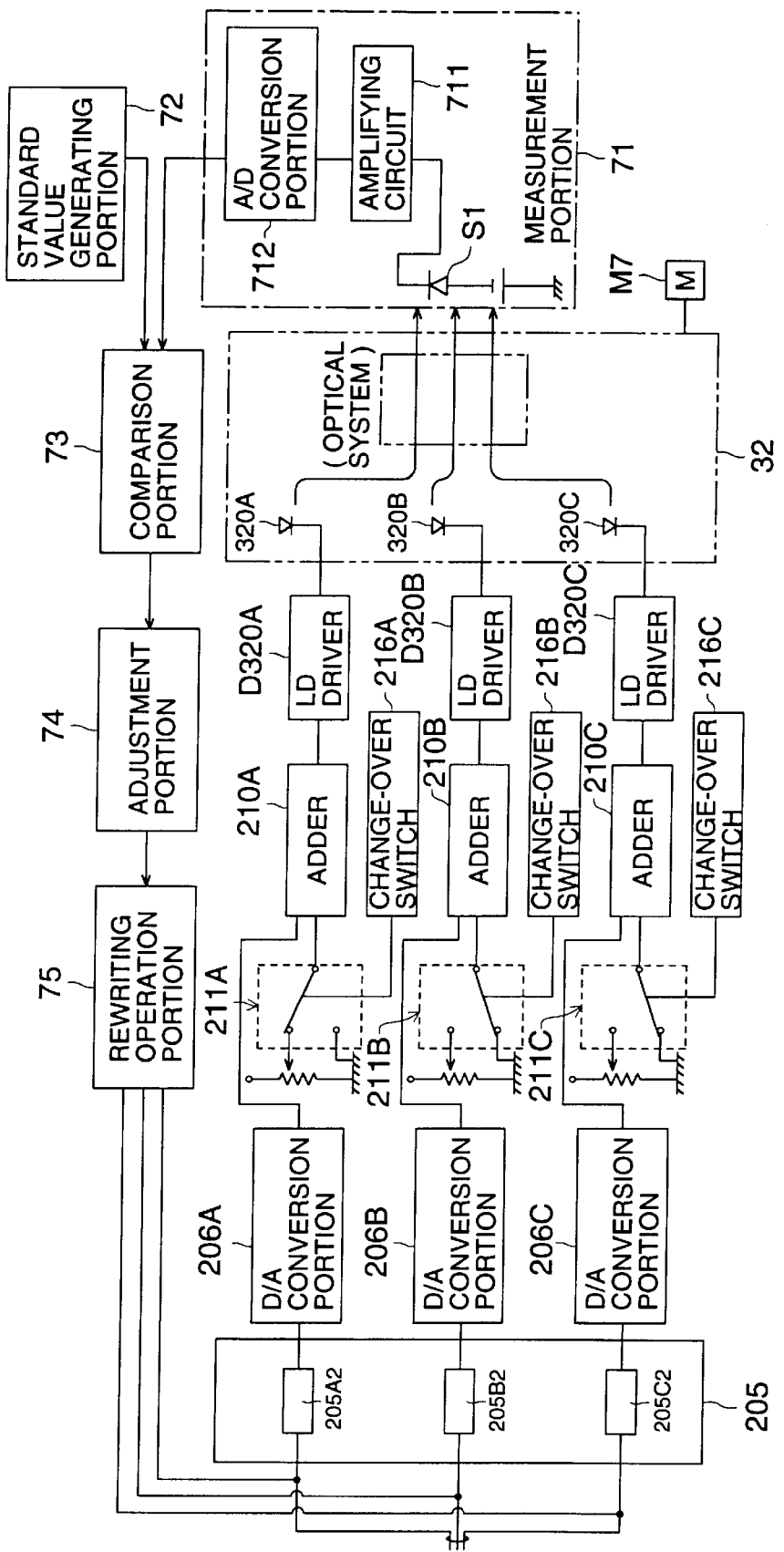
FIG. 6 is a block diagram showing an electrical structure in correcting the beam intensity in the embodiment of this invention.
Figure 7:
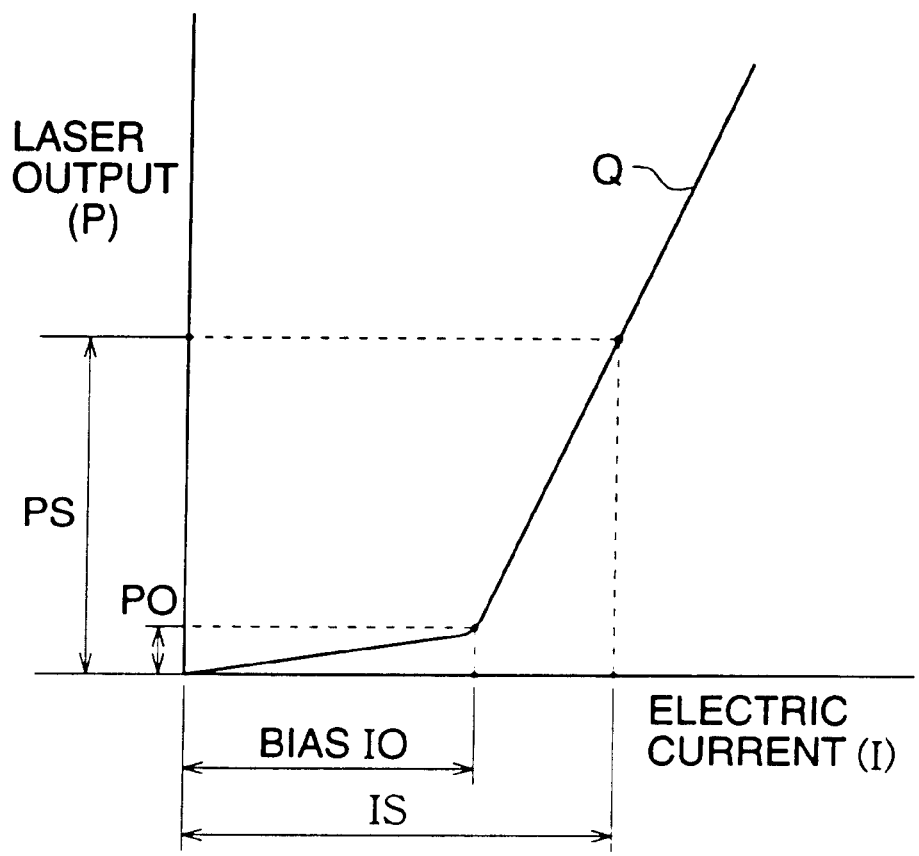
FIG. 7 is a schematic drawing showing the relation between laser diode current and laser output.
Figure 8:
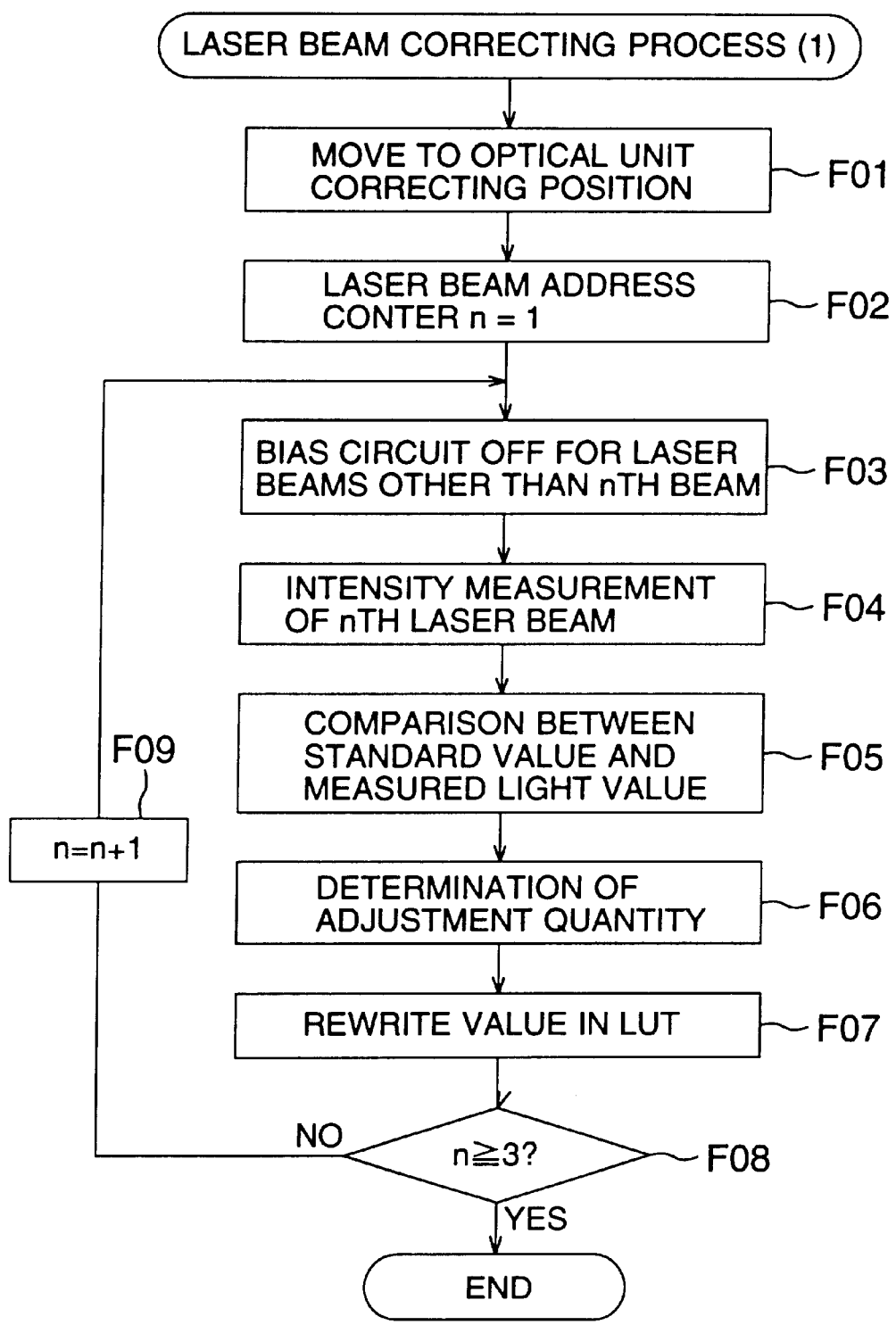
FIG. 8 is a flow chart showing a process for correcting the beam intensity in the embodiment of this invention.

In the following, the internal structure of the essential part of the embodiment of this invention will be explained. FIG. 5 is a schematic drawing showing a part of the structure of the essential part of an apparatus of an example of the embodiment of this invention relating to the correction of the beam intensity; FIG. 6 is a block diagram showing in detail the electrical structure of a part of FIG. 4 in the above-mentioned embodiment; FIG. 7 is a schematic graph showing the relation between the electric current of a laser diode and the laser output; and FIG. 8 is a flow chart showing the correcting process for the beam intensity of the laser diodes in the above-mentioned embodiment.

With reference to FIG. 5, the detailed internal structure of the optical unit and the internal structure of the correction for the beam intensity of the laser diodes will be explained. In addition, the same signs are put to the members that are mechanically and functionally the same as those shown in FIG. 3, and a part of the explanation will be omitted. In the optical unit 32, which is the light source portion, the red laser light sources 320, the blue laser light sources 321, and the green laser light source 322 are disposed. The photosensitive material on the drum. 31 is exposed with the red laser beams, the blue laser beams and the green laser beams through the reduction lens 331 and the focusing lens 334, wherein the red laser beams come through the beam regulating optical systems 323 and the mirrors 325 from the red laser light sources 320, the blue laser beams come through the beam regulating optical systems 324 and the mirrors 326 from the blue laser light sources 321 and the green laser beams come through the AOM (acousto-optic modulator element) 327 and the mirrors 328 and 330 from the green laser light source 322. The red laser light sources 320 are, namely, the three laser diodes 320A, 320B, and 320C. In the same manner, the blue laser light sources 321 are three of the laser diodes.

Further, it is preferable that the maximum electric power consumption of each laser diode is 10 W or less, especially 3 W or less and more especially 1 W or less. With this, it may be easy to lower the maximum total electric power consumption, to lower an amount of generated heat, to make the temperature of the laser diode constant, and to make the wavelength and the light intensity of the laser diode constant. Further, since the amount of generated heat is low, the fluctuation in the irradiating position on the light sensitive material, the amount of irradiation, the beam shape, and the focusing position caused by the fluctuation in the positional relationship among the optical elements due to the heat generated by the laser diodes can be refrained, and unsharp images and fluctuation in the amount of exposure can be refrained. Further, fluctuation in the wavelength of the emitted light and the strength of the emitted light can be refrained. Furthermore, it may be preferable to be 10 $\mu$W or more, especially to be 20 $\mu$W or more. With this, a sufficient amount of exposure can be obtained. In the apparatus of the present embodiment, it is 100 mW.

With regard to the absolute maximum rating light output (JIS C5942) of each laser diode, it may be preferable to be 150 mW or less, especially to be 50 mW or less, more especially 5 mW or less. With this, the maximum electric power consumption can be minimized. Especially, when it is 50 mW or less, it may be more preferable, because of high safety. Further, it may be preferable to be 1 mW or more, especially to be 0.5 mW or more. With this, the light amount to expose the light sensitive material can be made sufficient. In the apparatus of the present embodiment, it is 3 mW.

With regard to the driving frequency (MHz) of each laser diode, from the view of the exposing speed, it may be preferable to be 0.5 MHz or more, especially to be 1 MHz or more. From the views of the stability of the exposure driving circuit, the stability of the exposure amount and the exposing position for the generated heat and the cost for the circuit, it may be preferable to be 100 MHz or less, especially to be 50 MHz or less, more especially to be 20 MHz or less. In the apparatus of the present embodiment, it is 8 MHz.

Further, with regard to a number of recording dot per sec. by the drum 31 and the optical section 32, it may be preferable to be 3 million dots/sec. or more, especially to be 10 million dots/sec. or more. With this, the both of the high speed image recording and the high accurate image recording can be attained. Further, it may be preferable to be lower 4 billion dot/sec. or less, especially to be lower than 5 hundred million dots/sec. or less. With this, the driving circuit becomes stable, the image recording becomes stable, the exposure intensity and the exposing position become stable, the cost can be reduced, and the adjustment can be made easier. In the apparatus of the present embodiment, it is 30 million dots/sec.

The optical unit 32 is fixed to the moving belt 340, and the moving belt is entrained around a pair of pulleys; the optical unit 32 is moved parallel to the drum axis by the driving of the sub-scan motor M7.

When the laser beam intensity is measure, the optical unit 32 moves and stops at the laser beam intensity measuring position at which the beam from the optical unit 32 comes in incidence to the optical sensor S10 in order to measure the laser beam intensity.

As shown in FIG. 6, the beam intensity correction for red laser diodes as an example will now be explained.

The LUT 205 memorizes the light emission levels prescribing the correspondence between the basic colors in printing Y (yellow), M (magenta), C (cyan), BK(black). and the laser beam intensity composition of the light sources, namely, the laser beam intensity corresponding to R, G, and B laser beam, to which the photosensitive material is to be exposed, in the LUT's 205A2, 205B2, and 205C2.

The D/A conversion portions 206A, 206B, and 206C convert the values of R, G, B converted by the LUT 205 into analogue values respectively. That is, the D/A conversion portions 206A, 206B, and 206C convert the digital image data into image analogue signals in the form of the analog signal. The bias circuits 211A, 211B, and 211C are the circuits for letting the bias currents to be applied to each leaser diode of the light source section flow in the laser diodes. The bias change-over switches 216A, 216B, and 216C make the bias currents in the bias circuits 211A, 211B and 211C on and off so as to change a biased state or an unbiased state. In writing an image in the photosensitive material, they let the bias currents flow, and in measuring the beam intensity of the laser diode, they let the bias voltage drop to the ground to cause the bias current to become zero.

In the adders 210A, 210B, and 210C, the output currents of the image analogue signals after conversion from the D/A conversion portions 206A, 206B and 206C and the bias currents are added to get image output signals. The LD drivers D320A, D320B, and D320C make intensity modulation of the laser beams by driving the laser diodes 320A, 320B and 320C respectively with the output image signals (the currents obtained by adding the output currents and the bias currents). The measuring portions 71 measures the beam intensity of the laser diode. As shown in FIG. 3, the measuring portion 71 has a sensor S1 at the outside of one end of the drum 31. When the optical unit 32 is located at the beam intensity measuring position, a beam emitted from the optical unit 32 is received by a beam receiving surface of the sensor S1. Then, the sensor S1 outputs a signal corresponding to an amount of the received beam. The measuring portion 71 receives the red laser beam by the sensor S1. The amplifying circuit 711 amplifies the signal from the sensor S1. The A/D conversion portion 712 digitalizes the amplified signals and transmits the measuring light values to the comparison portion 73.

The control means corrects the light emission intensity of a plurality of laser diodes on the basis of the result of the measurement of the beam intensity of the laser diodes. The control means is composed of, for example, the standard value generating portion 72, comparison portion 73, the adjusting portion 74, etc.; the standard value generating portion 72 transmits the standard values to the comparison portion, here, the standard values are the basis for the beam intensity correction of the laser diodes. The comparison portion 73 compares the aforesaid results of measurement with said standard values. In the adjusting portion 74, the amounts of adjustment are determined on the basis of the results of comparison. Further, the rewriting operation portion 75 obtains the correction values of the laser beam intensity level of the laser diodes from said amounts of adjustment, corrects the laser beam intensity level with the correction values and inputs them in the LUT 205A2, 205B2, and 205C2 to rewrite the laser beam intensity level to the corrected level.

Besides, now the relation between the electric current of a laser diode and the laser output will be explained with reference to FIG. 7. In FIG. 7, the electric current I for the abscissa shows the driving current of the laser diode, and the laser output P for the ordinate shows the light output of the laser diode against the driving current. Further, the curve Q has a shape nearly of folded lines as shown in the drawing. The bias current IO is approximately equal to the threshold value of laser emission in this embodiment, and when the bias current IO is let to flow, the laser diode emits light at a low level as an output PO. Further, when the electric current IS that is a standard current of laser diode is let to flow, the laser output PS that is the standard value of laser output is outputted. By letting the bias current IO flow, the carrier concentration in the active layer is kept always at the level PO of the laser output; hence, delay in the rise up of the output can be approximately neglected, and it becomes possible to write at a high speed. Moreover, even though the bias current is let to flow during writing the image information, the laser output gives no influence to the recording medium owing to its low level. In addition, the bias current IO is preferable, but is not limited to the above-described one, and it may be any value that the laser diode emits weak light.

However, for example, if the bias current IO is kept to flow during the measurement for correcting the beamn intensity of the laser diode 320A, the leakage light from the laser diodes 320B and 320C is added to the sensor S1 at the time of measurement of the correction object 320A, which (lives an unfavorable influence to the precision of the light measurement. For this reason, in this embodiment, it is made a rule to let the bias current IO not flow, during the measurement for correcting the beam intensity of the laser diodes.

From now on, as an example of the correction of the beam intensity of a laser diode, the correction of the beam intensity of the three laser diodes of red color will be explained with reference to FIG. 5, FIG. 6, and the flow chart of FIG. 8. First, the motor M7 moves the optical unit 32 to the position for measuring the laser beam intensity, at which the sensor S1 is irradiated by the beams BA, BB, and BC of the three laser diodes (F01). Next, the counter for counting the address of the beams of the laser diodes is set at the count n=1 (F01). Next, the bias circuits for laser beams other than n-th beam. For example, on 1st laser beam which is; emitted by 1st red laser light source 320A, the bias circuits 207B and 207C are cut off the bias currents by the bias change-over switches 216B and 216C (F03). Now, the photosensor S1 measures the beam intensity of n-th laser beam. For example, the 1st red laser light source 320A is let to emit light to measure the beam intensity by the photo-sensor S1 (F04). Then, the comparison portion 73 compares the measured light intensity with the standard value for correction from the standard value generating portion 72 (F05). And, the adjusting portion 74 determines the amount of adjustment on the basis of the result of comparison (F06). Further, the rewriting operation portion 75 obtains the corrected value of the light emission level in the ON-state of the beam on the basis of the amount of adjustment, and inputs the corrected value of the light emission level in the LUT 205A2 for rewriting (F07). Next, it is judged if n≦3 (F08), and set the count of the counter to n=n+1 (F09). From this on, the 2nd red laser light source 320B is let to emit light and the same sequence is repeated. Further, the 3rd red laser light source 320C is let to emit light and the same sequence is repeated, until the correction of the beam intensity of the three red laser diodes is completed. In addition, the method of making the bias current zero is not limited to the above-described one, and it may be appropriate, for example, to make it zero the supplied voltage to the bias circuit shown in FIG. 6.

As has been explained in the above, according to the image recording apparatus of this embodiment, the measuring of the beam intensity of each of the laser diodes can be made with a high precision, it is possible to write at a high speed, and moreover, the correction of the beam intensity of each of the laser diodes can be made with a high precision.

Figure 9:
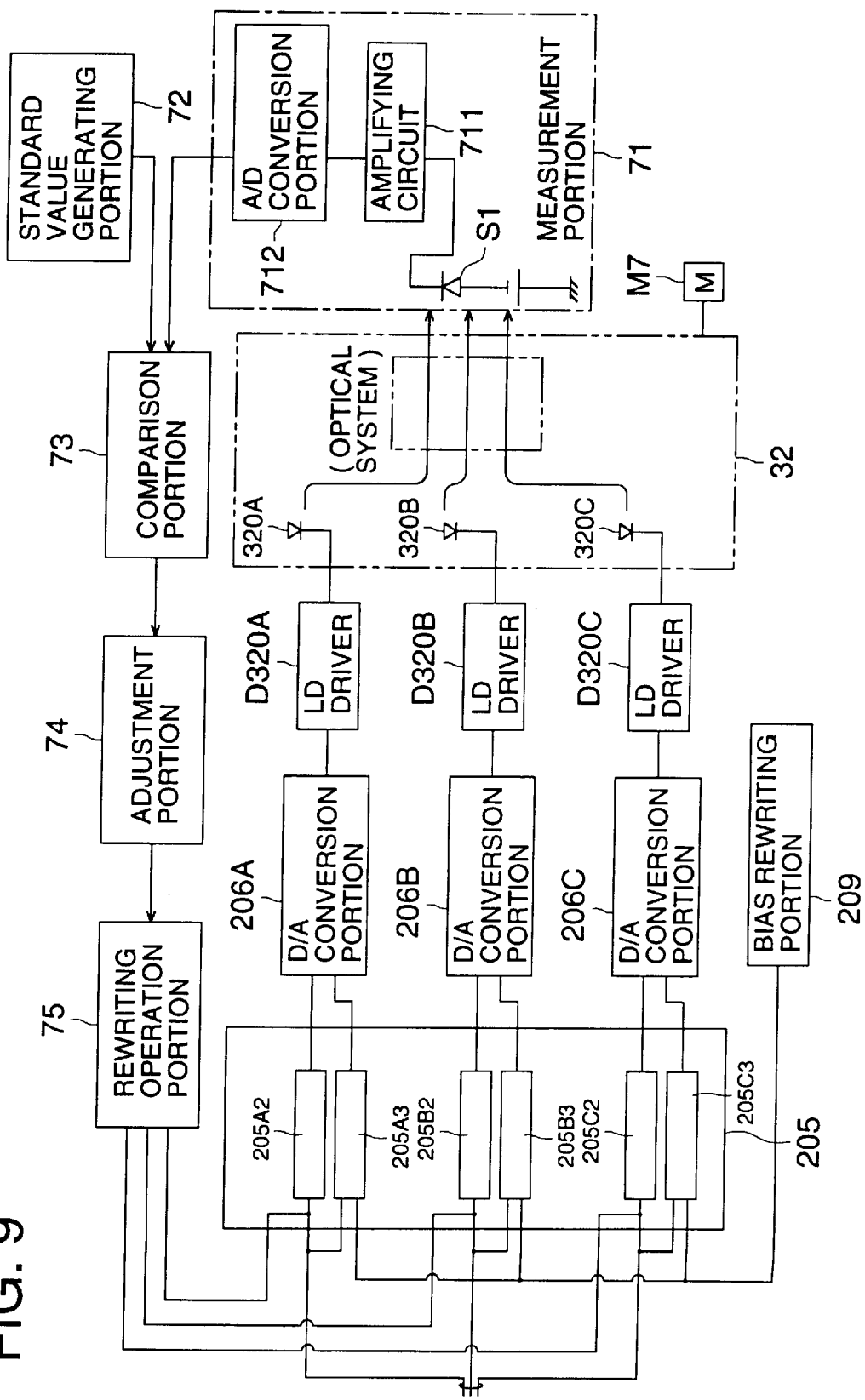
FIG. 9 is a block diagram showing another electrical structure in correcting the beam intensity in the embodiment of this invention.
Figure 10:
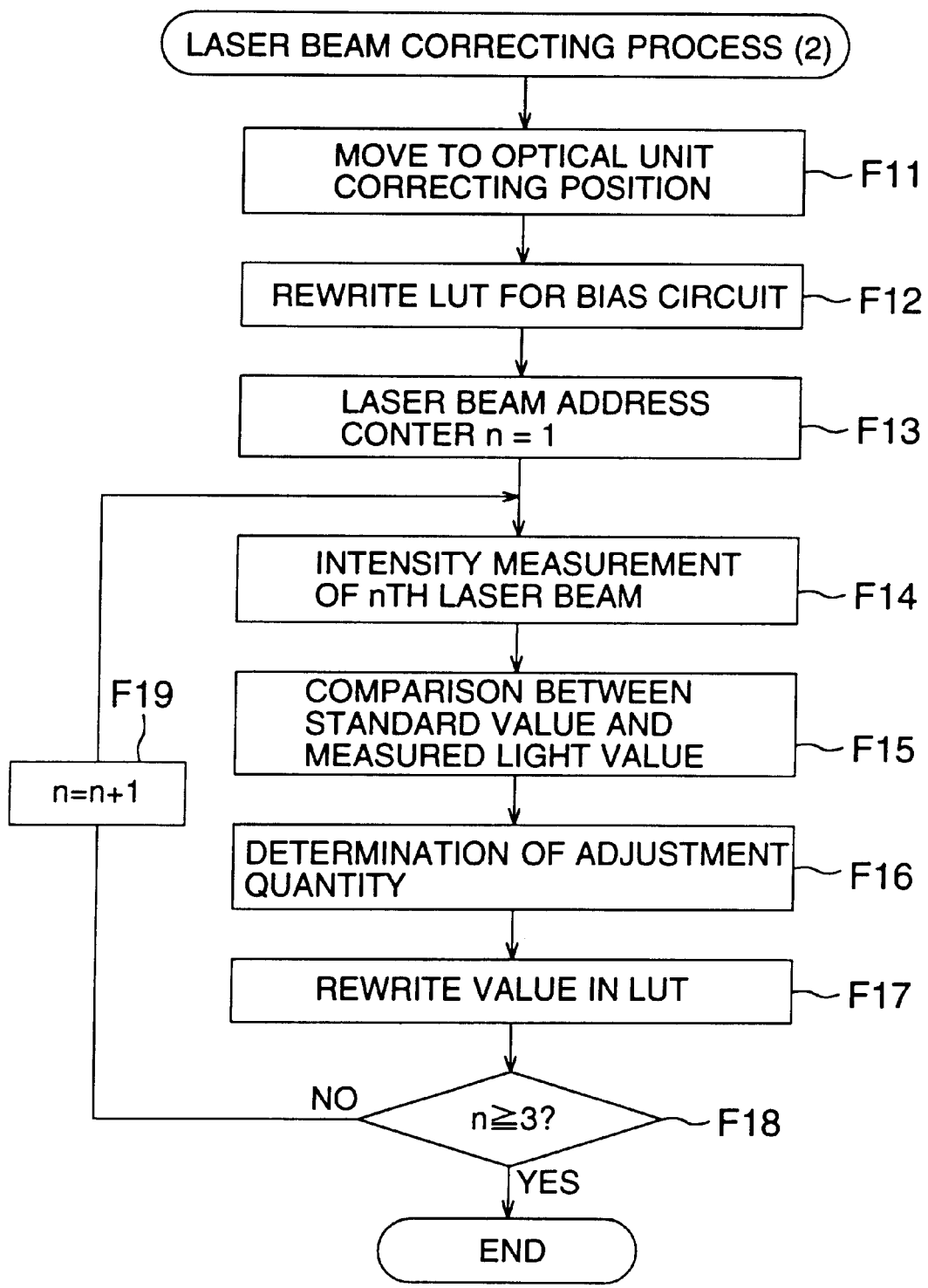
FIG. 10 is a flow chart showing another process for correcting the beam intensity in the embodiment of this invention.

In the following, another embodiment of an image recording apparatus will be explained. FIG. 9 is a block diagram showing the electrical structure in the correction of the beam intensity in said another embodiment, and FIG. 10 is a flow chart showing the process of correcting the beam intensity of a laser diode in said another embodiment. In addition, regarding the image recording apparatus, it is mechanically and functionally the same as that shown in FIG. 1 to FIG. 5, and the explanation will be omitted. Further, the same signs are put to the members that are mechanically and functionally the same as those shown in FIG. 6, and the explanation for them will be omitted.

Figure 11:
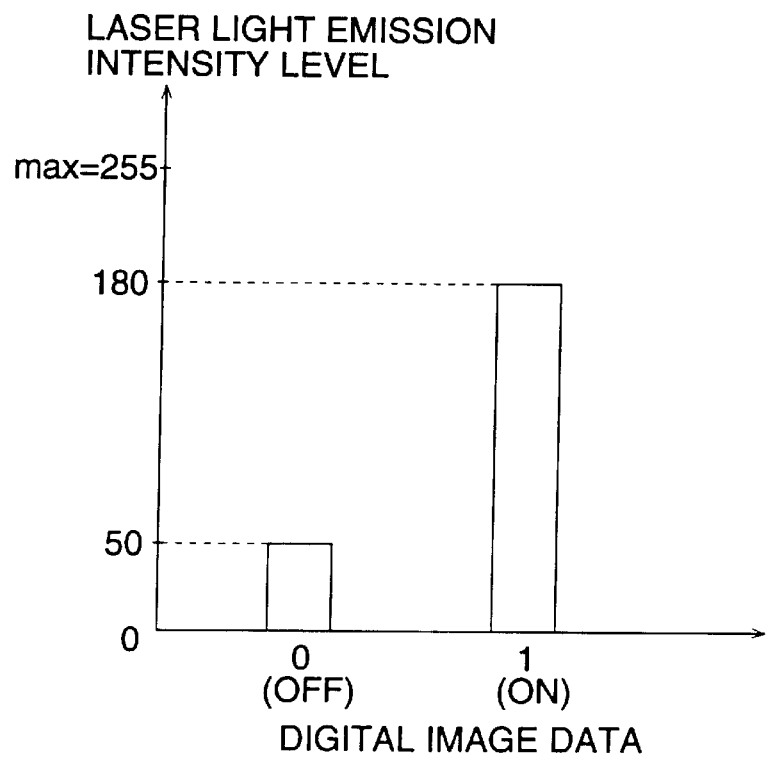
FIGS. 11(a) and 11(b) are diagrams showing a laser light emission intensity level.
Figure 11:
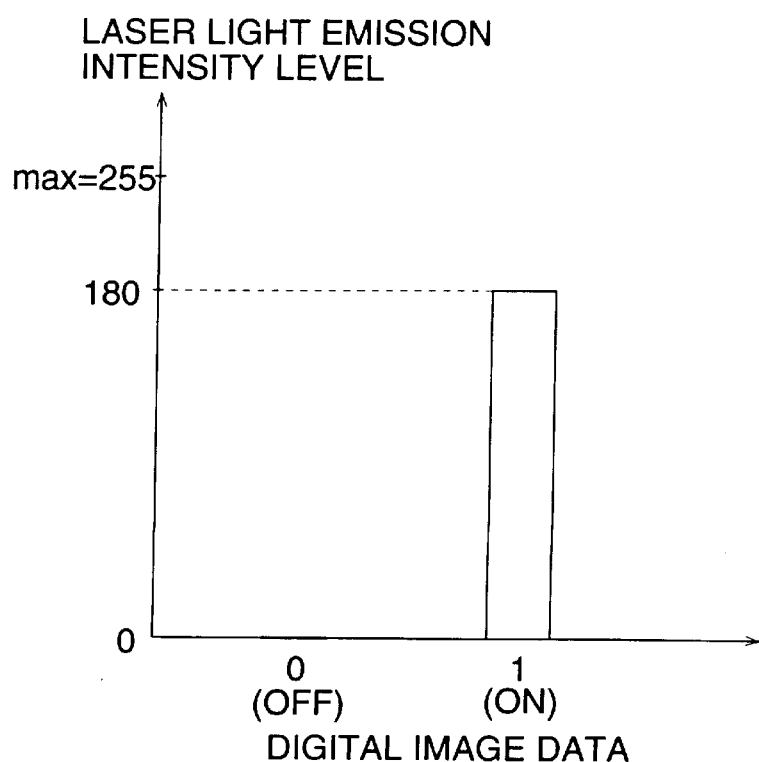

With reference to FIG. 9, as an example, the correction of the beam intensity for the red laser diodes of another embodiment will be explained. The LUT 205 memorizes the light emission levels of ON and OFF of the red (R) laser light sources. The LUT 205 can set the light emission level at the time of writing a pixel in the ON-state and at the time of no writing a pixel in the OFF-state respectively for the red laser diodes. For example, as shown in FIGS. 11(a) and 11(b) showing a laser light emission intensity level (laser beam emission intensity level, that is, an intensity level to emit a laser beam) for the binary digital image data of ON and OFF, at the time of recording image information shown in FIG. 11(a), the level is set at a numeral value of 180 at the time of writing pixel in the ON-state and is set at a numeral value of 50 at the time of no writing pixel in the OFF-state. Further, at the time of measuring the beam intensity of each of the red laser diodes shown in FIG. 11(b), the level is set at the numeral value 180 which is the same as the above for the pixel in the ON-state, and is set at a numeral value of zero for the pixel in the OFF-state in order to make the bias to be in unbiased state.

Further, D/A converting portions 206A, 206B and 206C convert digital image data of R, G, and B converted by the LUT 205 into image output signal in the form of analogue signal. Then, LD driver D320A, D320B and D320C drive the Laser diode 320A, 320B and 320C so as to emit laser beam.

The bias rewriting portion 209 set a bias to be the biased state as an effective bias condition at the time of recording an image and makes the bias to be in the unbiased state as a no bias condition at the time of measuring the beam intensity of each of the red laser diodes. For example, the level value in the LUT's 205A3, 205B3, and 205C3, which memorizes the value of light emission level for pixel in the OFF-state, is rewritten into the value of 80 in the biased state at the time of recording an image, and into the value of zero in the unbiased state at the time of measuring the beam intensity. Incidentally, the light emission level for pixel in the ON-state is memorized in the LUT's 205A2, 205B2, and 205C2.

Now, the procedure of the beam intensity correction for the three red laser beams, as an example, in said another embodiment will be explained with reference to FIG. 5, FIG. 9, and the flow chart in FIG. 10. First, the optical unit 32 is moved to the position at which the sensor S1 is irradiated by the beams BA, BB, and BC of the three laser diodes (F11). Next, the light emission level in the LUT's 205A3, 205B3, and 205C3 is rewritten into, for example, zero in the unbiased state by the bias rewriting portion 209 (F12). Next, the counter for counting the address of the beams of the laser diodes is set to the count n=1 (F13). The beam intensity is measured when n-th laser diode emits light beam at the corrected light emission intensity level. For example, when n=1, the first red laser light source 320A is let to emit light at a predetermined level, the light beam is received by the photo-sensor S1 and the beam intensity from the laser diode is measured (F14). Then, the comparing portion 73 compares the measured light value with the standard value from the standard value generating portion 72 (F15), and the amount of adjustment is determined in the adjusting portion 74 on the basis of the result of comparison (F16). Further, the rewriting operation portion 75 obtains a correction value on the basis of the amount of adjustment, corrects the laser beam emission intensity level at the ON-state with the obtained correction value, and replaces the laser beam emission intensity level in the LUT 205A2 with the corrected laser beam emission intensity level. (F17). Next, it is judged if n does not exceed three (F18), and increase the count value in the counter by one (F19). From this on, the second red laser light source 320B is let to emit light and the same sequence is repeated. Further, the third red laser light source 320C is let to emit light and the same sequence is repeated, until the correction of the beam intensity of the three red laser diodes is completed.

As has been explained in the above, according to the method of correcting the beam intensity of the image recording apparatus of this invention, the correction of the beam intensity of each of the laser diodes can be made with a high precision; and further, according to the image recording apparatus of this invention, it is possible to write at a high speed, and moreover, the correction of the beam intensity of each of the laser diodes can be made with a high precision.

Because the invention has a structure as described in the foregoing, it has effects described in the following.

In this image recording apparatus having a plurality of laser diodes, it is possible to write at a high speed, and moreover, the measuring of the beam intensity of each of the laser diodes can be made with a high precision.

In the following, the timing of measuring the beam intensity in this embodiment will be explained with reference to the drawings.

Temperature sensors 1600 are provided in the neighborhood of the laser diodes 320 and 321, and transmits the detected result to the control portion 100.

"MEASUREMENT TIMING (1)"

Now, the measurement timing (1) will be explained with reference to the flow chart in FIG. 12 and the illustrations for the operation in FIG. 13.

Figure 12:
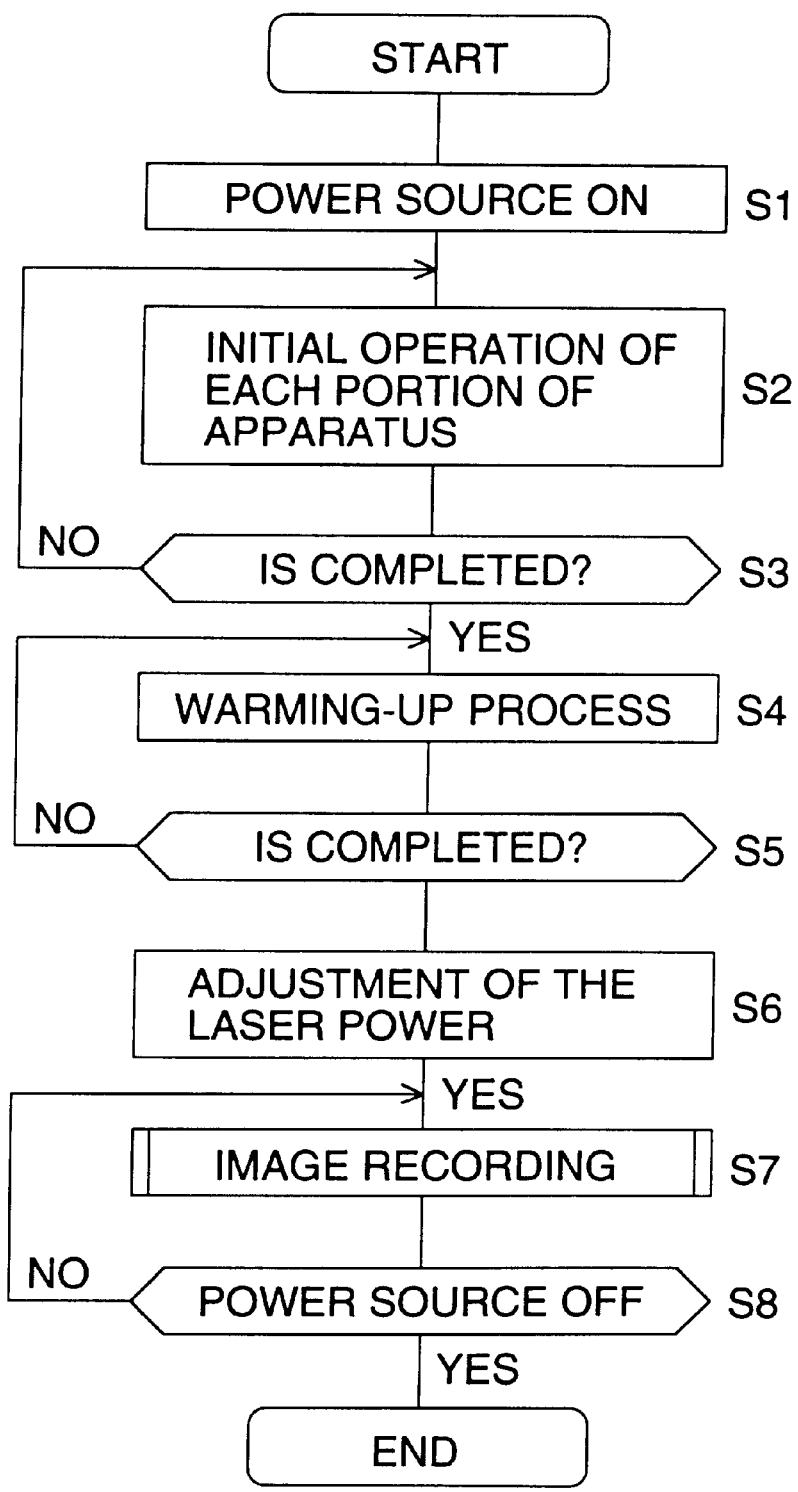
FIG. 12 is a flow chart for illustrating the measurement timing (1)

First, the power source of the image recording apparatus is turned on by the user (S1 in FIG. 12). When the power source is turned on, the control portion 100 makes the image recording apparatus start to operate in accordance with an operation program. That is, the control portion 100 makes various portions of the apparatus perform initial operations (initialization) (S2 in FIG. 12). In the above-mentioned initial operations, the various operations such as the operation to return the mechanical structural portion to the initial positions, and the operation to store a predetermined initial value in a register are included.

At the timing when the above-mentioned initial operations are finished (YES in S3 in FIG. 12), the control portion 100 gives an instruction for warming-up process to the developing process unit 4 etc. (S4 in FIG. 12). In this warming-up process, a process to bring the developer into the predetermined state is carried out in the developing process unit 4.

When this warming-up process is completed (S5 in FIG. 12), the measuring portion 71 measures the intensity of the laser beam from the optical unit 32, and the adjustment to make the intensity of the laser beam from the optical unit 32 on the sensor S1 have the predetermined value will be done.

In this case, first, the predetermined driving current is supplied from the LD driver D320, D321 to the laser diodes 320, 321, and the intensity of the laser beam at that time is measured by the measuring portion 71. Then, the control portion 100, having received the result of the measurement in the measuring portion 71, obtains the corrected value of the light emission level in LUT 205 to make the intensity of the laser beam have the predetermined value with reference to the LUT 205, and stores the corrected value of the light emission level in LUT 205 and gives an instruction to correct the driving current value to the LD driver D320, D321 (S6 in FIG. 12). By repeating such a feed-back process, the control portion 100 completes the process for adjusting the intensity of the laser beam from the laser diodes 320, 321 on the sensor S1 (laser power) by adjusting the value of the light emission level in the LUT 205 at the timing when the laser beam having the predetermined intensity is obtained from the OPTICAL UNIT 32.

When the above-mentioned initial operations, warming-up process, and the adjustment of the laser power are completed, the control portion 100 displays in the liquid crystal panel 11 that the image recording apparatus is in the state capable of operating. Further, it is possible that the control portion 100 displays in the liquid crystal panel 11 that the image recording apparatus is in the preparatory state for operation.

Then, while the image recording apparatus is in the state capable of operating, the control portion 100 carries out image recording when the image data is supplied from external equipment (S7 in FIG. 12). Further, the above-mentioned image recording process is continued until the power source is turned off (S8 in FIG. 12).

Figure 13:
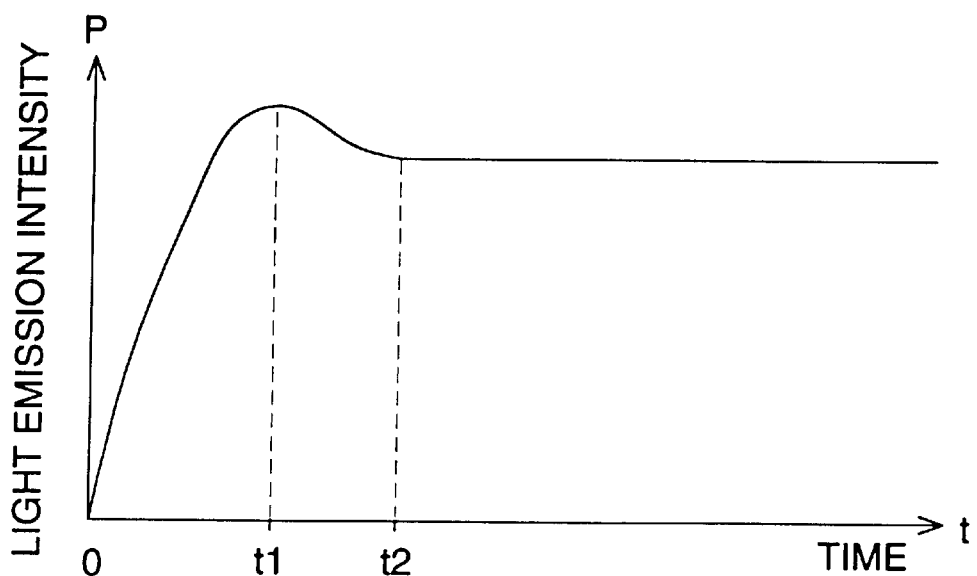
FIGS. 13(a) and 13(b) are illustrations showing a state of operating at the measurement timing (1)
Figure 13:
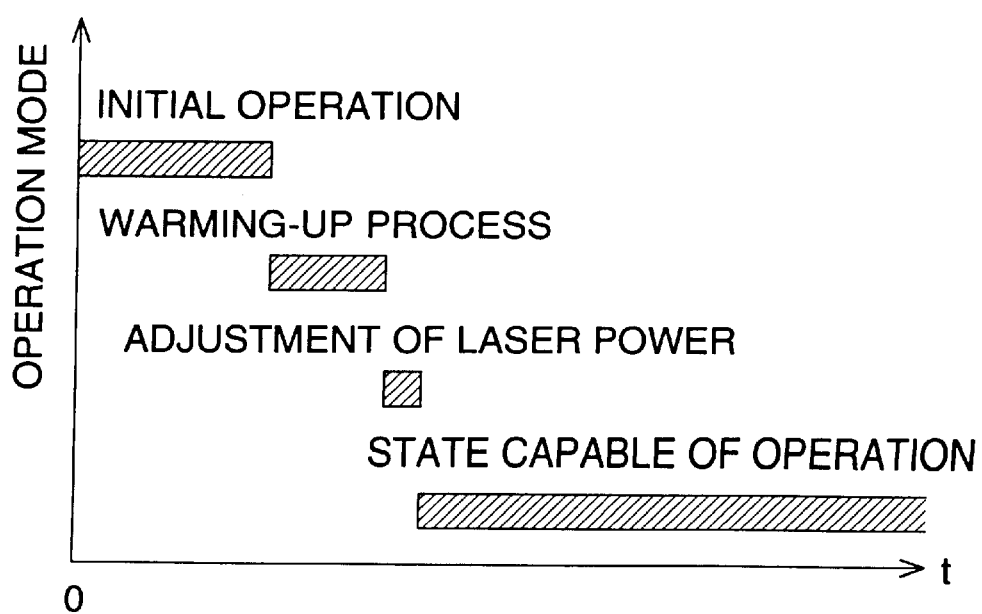

As has been explained in the above, the intensity of the laser beam is adjusted at the timing when the initial operations and the predetermined warming-up process is completed (t2 in FIG. 13($a$)); hence, when compared with the conventional adjustment timing (t1 in FIG. 13($a$)), the timing when the light emission intensity of the laser diocles 320, 321 of the optical unit 32 is unstable (near the peak of the light emission intensity in FIG. 13($a$)) can be avoided, and it becomes possible that the optical unit 32 keeps the light emission of the predetermined intensity.

In addition, in the above explanation, it is described that the adjustment of the laser power is carried out after the warming-up process, however, it is possible that the adjustment of the laser power is carried out after the passage of a predetermined time from the start of the warning-up process. By doing this way, the adjustment of the laser power can be made at a definite timing regardless of the time required for the warming-up process.

Moreover, in the explanation given in the above, it is also possible that the processing time of the warming-up process or the predetermined time from the start of the warming-up process is set or changed from the touch panel 12. In that case, it becomes possible to set any suitable time in accordance with the environment or the request of the user. That is, the adjustment can be carried out in accordance with the request such as that the adjustment of the laser power should be made after the passage of an adequate time or that the adjustment of the laser power should be made as soon as possible after the turning on of the power source.

"MEASUREMENT TIMING (2)"

Now, with reference to the flow chart in FIG. 14, the measurement timing (2) will be explained.

Here, it is shown an example of the embodiment of the laser power adjustment during the recording of an image (S7 in FIG. 12) in said FIG. 12.

Figure 14:
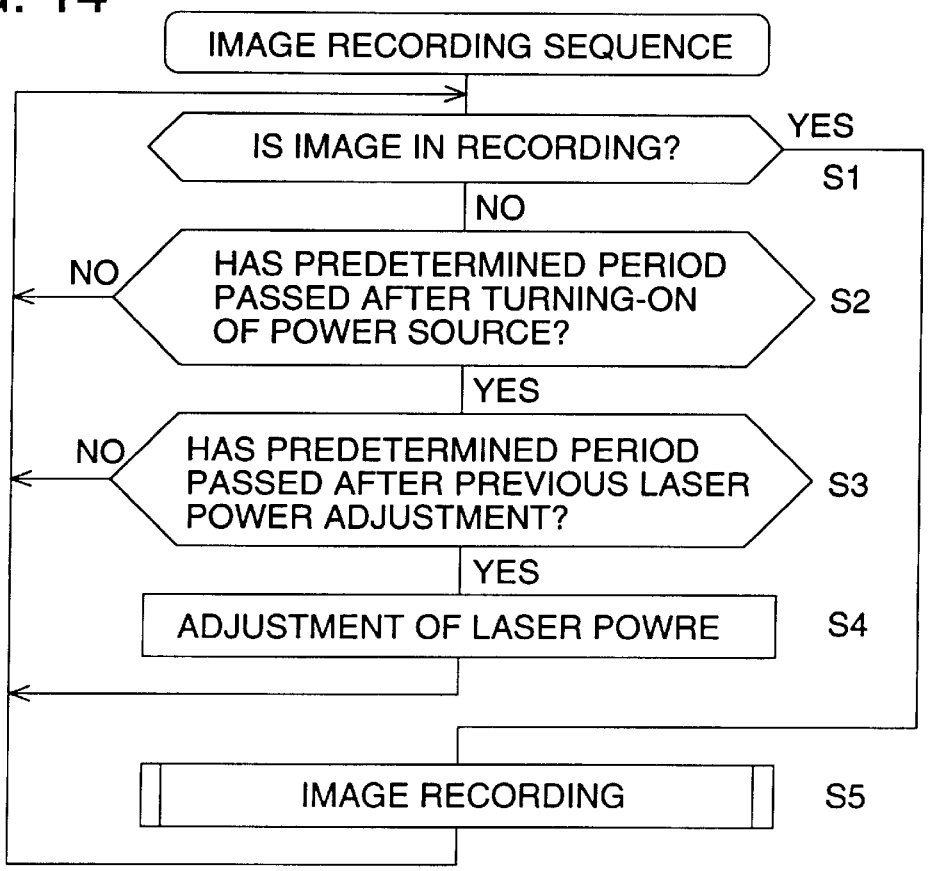
FIG. 14 is a flow chart for illustrating the measurement timing (2)

In this sequence of the recording of an image, first, the control portion 100 detects if an instruction to record an image is given from external equipment (S1 in FIG. 14). If an instruction to record an image is given (YES in S1 in FIG. 14), the control portion 100 carries out the recording of the image (S5 in FIG. 14).

If no instruction to record an image is given (NO in S1 in FIG. 14), it is watched that a certain period of time has passed from the preceding adjustment of the laser power (S2 in FIG. 14). The certain period of time in this case means the period of time such that a considerable time has passed from the turning-on of the power source or from the preceding adjustment of the laser power and it is considered desirable to make an adjustment of the laser power again; for example, the period of eight hours, which corresponds to the conventional working time of a day, corresponds to it.

If this certain period of time has not passed (NO in S2 and NO in S3 in FIG. 14), the procedure returns to the step waiting for an instruction to rerecord an image from external equipment (S1 in FIG. 14).

On the other hand, if the certain period of time has passed from the turning-on of the power source (YES in S2 in FIG. 14), and if the certain period of time has passed from the preceding adjustment of the laser power (YES in S3 in FIG. 14), the intensity of the laser beam from the optical unit 32 is measured by the measuring portion 71, and it is carried out the adjustment to make the intensity of the laser beam have the predetermined value.

In this case, first, the predetermined driving current is supplied from the LD driver D320, D321 to the laser diodes 320, 321, and the intensity of the laser beam at that time is measured by the measuring portion 71. Then, the control portion 100, having received the result of the measurement in the measuring portion 71, obtains the driving current to make the intensity of the laser beam have the predetermined value with reference to the LUT 205, and gives an instruction to correct the intensity of the driving current to the LD driver D320, D321 (S4 in FIG. 14). By repeating such a feed-back process, the control portion 100 completes the process for adjusting the laser power at the timing when the laser beam having the predetermined intensity is obtained from the optical unit 32. Then, if this adjustment of the laser power is completed, the procedure returns to the step waiting for an instruction to record an image from external equipment (S1 in FIG. 14).

In addition, in the above flow chart, if any recording of an image is being done at the timing when the (certain period of time has passed, the adjustment of the laser power will be done immediately after the recording of the image is finished (S4 in FIG. 14).

As described in the above, by making the adjustment of the laser power every certain period of time, even in the case where the image recording apparatus is continuously used for 24 hours without stopping, the adjustment of the laser power is to be periodically performed. Accordingly, it can be prevented the situation such that the apparatus is used continuously with the adjustment of the light emission intensity made only once when the power source is turned on. Owing to this, even though the light emission intensity is brought into a state different from that at the time of turning-on of the power source from several kinds of causes, it is kept back in a correct state by the periodical adjustment.

Further, in the explanation given in the above, the adjustment is made every eight hours as an example of the certain period of time, however, it is possible that this certain period of time is made to be changed. That is, it is possible that the above-mentioned certain period of time is set or changed from the touch panel 12. Moreover, it is possible to set not a certain period of time but a time (early morning or during lunch time, when frequency of use is small) or the day of the week (Saturday or Sunday, being the holiday). In that case, it is possible to set any suitable period of time or time in accordance with the environment or the request of the user.

"MEASUREMENT TIMING (3)"

Now, with reference to the flow chart in FIG. 15 and the illustration of operation in FIG. 16, the measurement timing (3) will be explained.

Here, it is shown an example of the embodiment of the adjustment of the laser power during the recording of an image (S7 in FIG. 12) in the above-mentioned FIG. 12.

Figure 15:
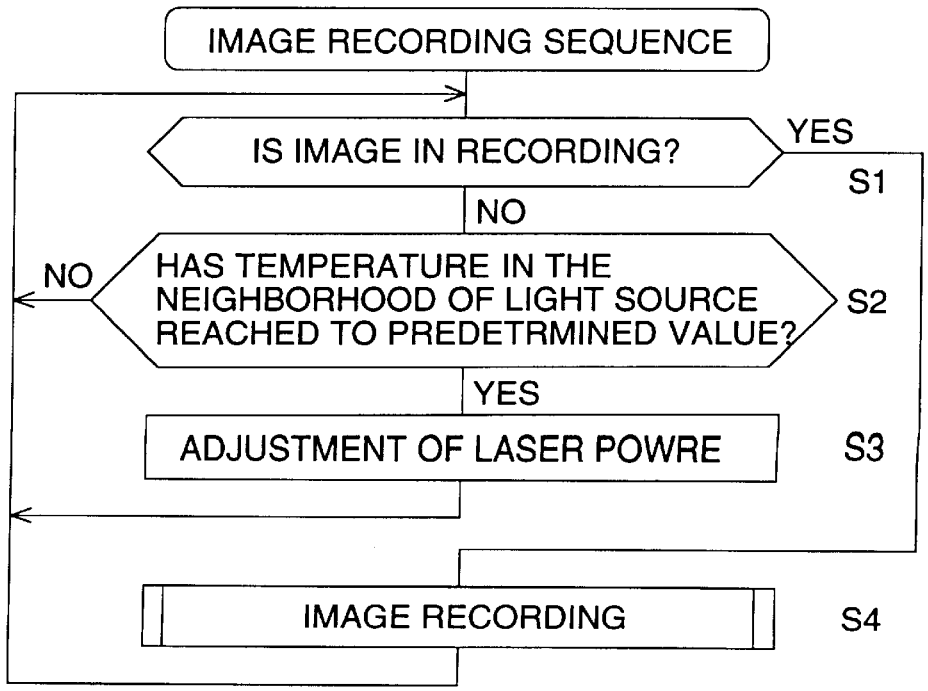
FIG. 15 is a flow chart for illustrating the measurement timing (3)

In this image recording sequence, first, the control portion 100 detects if an instruction to record an image is given from external equipment (S1 in FIG. 15). If an instruction to record an image is given (YES in S1 in FIG. 15), the control portion 100 executes the recording of the image (S4 in FIG. 15).

If no instruction to record an image is given(NO in S1 in FIG. 15), it is watched from the result of the measurement by the temperature sensor 1600 that the temperature in the neighborhood of the optical unit 32 (including the laser diodes 320, 321, the lens, the mirror, etc.) reaches to the predetermined value Ta (refer to FIG. 16) (S2 in FIG. 15). As for the predetermined temperature Value in this case, it is set the value to which the temperature reaches after use for a long time.

If the temperature has not reached to this predetermined value (NO in S2 in FIG. 15), the procedure returns to the step waiting for an instruction to record an image from external equipment (S1 in FIG. 15).

On the other hand, if the temperature has reached to the predetermined value (YES in S2 in FIG. 15), the intensity of the laser beam from the laser diodes 320, 321 is measured by the measuring portion 71, and it is carried out the adjustment to make the intensity of the laser beams have the predetermined value.

Figure 16:
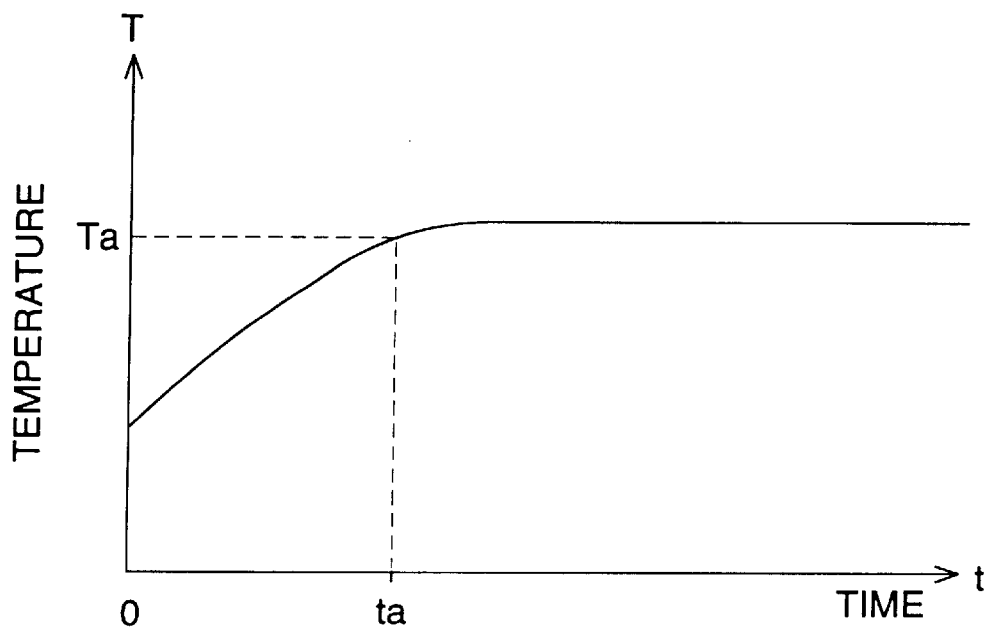
FIG. 16 is an illustration showing a state of operation at the measurement timing (3)

In the example shown in FIG. 16, the temperature begins to rise from the time of turning-on of the power source owing to the heat generated by the various portions inside the image recording apparatus, and becomes constant at a certain temperature value where the amount of heat dissipation becomes equal to that of heat generation. In this example, the adjustment of the laser power is made at the timing when the temperature reaches to the value Ta, that is, when the time ta has passed from the turning-on of the power source.

In this case, first, the predetermined driving current is supplied from the LD driver D320, D321 to the laser diodes 320, 321, and the intensity of the laser beam at that time is measured by the measuring portion 71. Then, the control portion 100, having received the result of the measurement in the measuring portion 71, obtains the driving current to make the intensity of the laser beam have the predetermined value with reference to the LUT 205, and gives an instruction to correct the intensity of the driving current to the LD driver D320, D321 (S3 in FIG. 15). By repeating such a feed-back process, the control portion 100 completes the process for adjusting the laser power at the timing when the laser beam having the predetermined intensity is obtained from the optical unit 32. Then, if this adjustment of the laser power is completed, the procedure returns to the step waiting for an instruction to rerecord an image from external equipment (S1 in FIG. 15).

In addition, in the above flow chart, if any recording of an image is being done at the timing when the temperature has reached to the predetermined value, the adjustment of the laser power will be done immediately after the recording of the image is finished (S2 and S3 in FIG. 15).

As explained in the above, by making the adjustment of the laser power at the timing when the temperature has reached to a predetermined value, a constant quantity of light can be applied to a recording material regardless of deviation, expansion and contraction of the optical system. Owing to this, even though the light emission intensity is brought into a state different from that given by the laser power adjustment at the time of turning-on of the power source from several kinds of causes, it is kept back in a correct state by the adjustment made at the temperature in practical use.

Further, in the explanation given in the above, the adjustment is made at the predetermined temperature value Ta, but it is possible for this temperature value to be changed. That is, it is also possible that the above-mentioned temperature value is set or changed from the touch panel 12.

Figure 17:
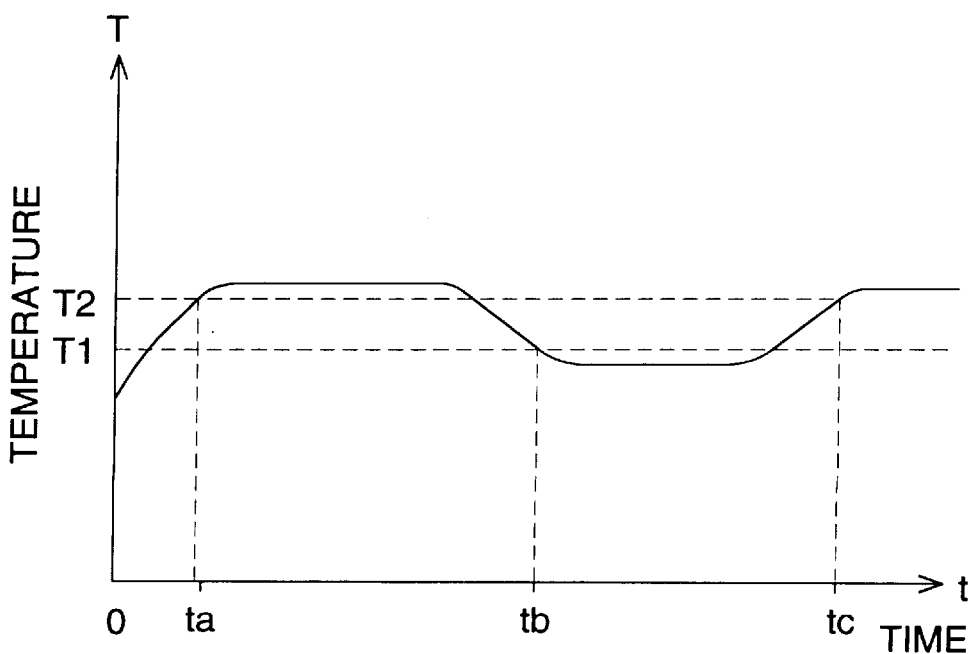
FIG. 17 is an illustration showing another state of operation at the measurement timing (3)

Moreover, the predetermined temperature value may be not a single value but substituted by a plurality of values. For example, as shown in FIG. 17, the temperature in the neighborhood of the light source sometimes varies with time, the temperature of the environment, the frequency of image recording, etc. In such cases, it may be appropriate that the temperature value T2 at higher temperature side and the temperature value T1 at lower temperature side are defined, and the adjustment of the laser power is made when the temperature has reached to any one of the values. In this case of FIG. 17, the adjustment of the laser power should be made at each of the timings ta when the temperature has reached to the value T2, tb when the temperature has reached to the value T1, and tc when the temperature has reached to the value T2 again. By doing this way, it becomes possible to obtain a correct light quantity at each of the temperatures.

"MEASUREMENT TIMING (4)"

Now, with reference to the flow chart in FIG. 18 and the illustration of operation in FIG. 19, the measurement timing (4) will be explained.

Here, it is shown an example of the embodiment of the adjustment of the laser power during the recording of an image (S7, in FIG. 12).

Figure 18:
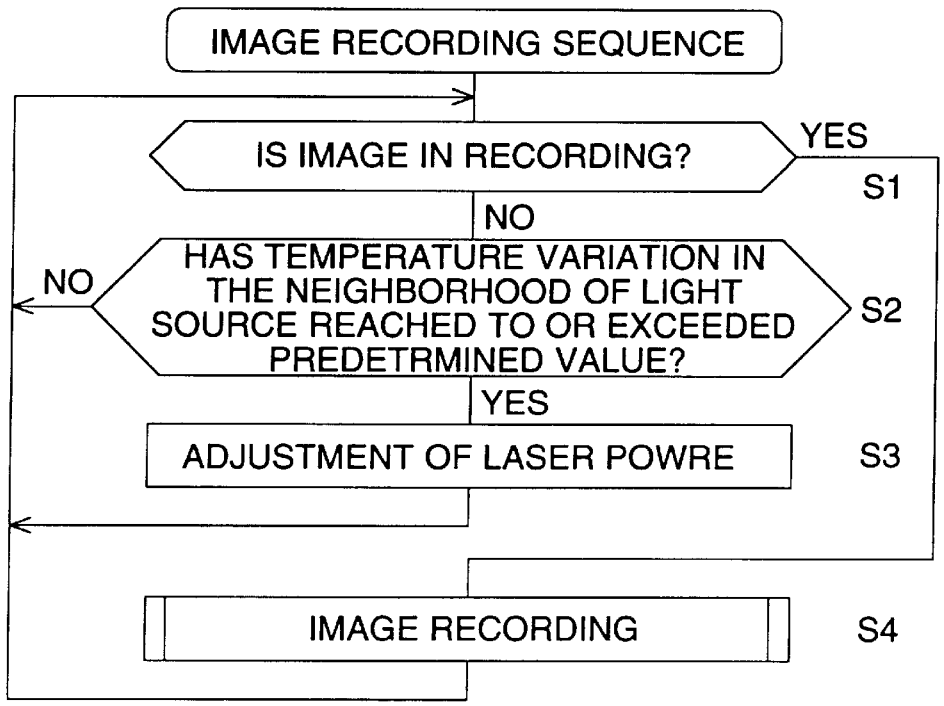
FIG. 18 is a flow chart for illustrating the measurement timing (4)
Figure 19:
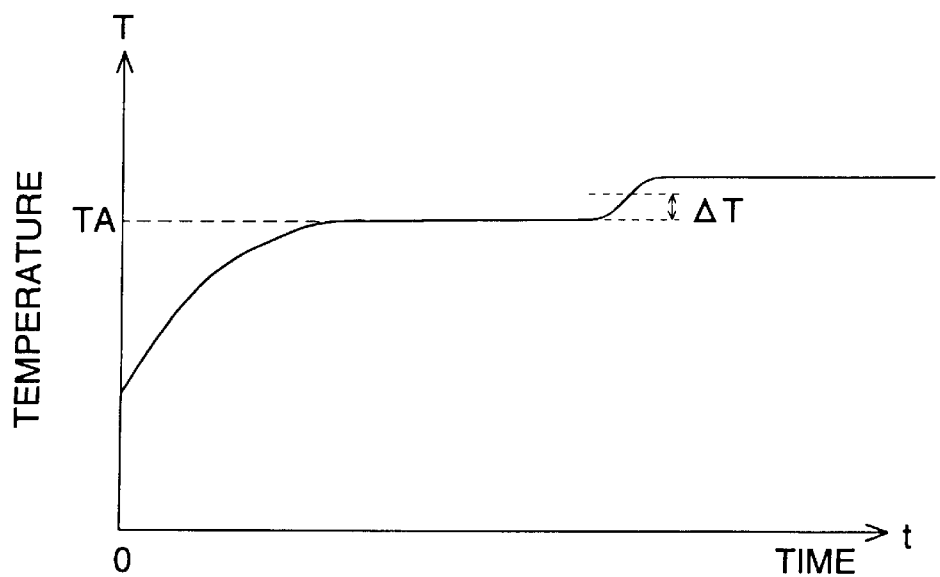
FIG. 19 is an illustration showing a state of operation at the measurement timing (4)
Figure 20:
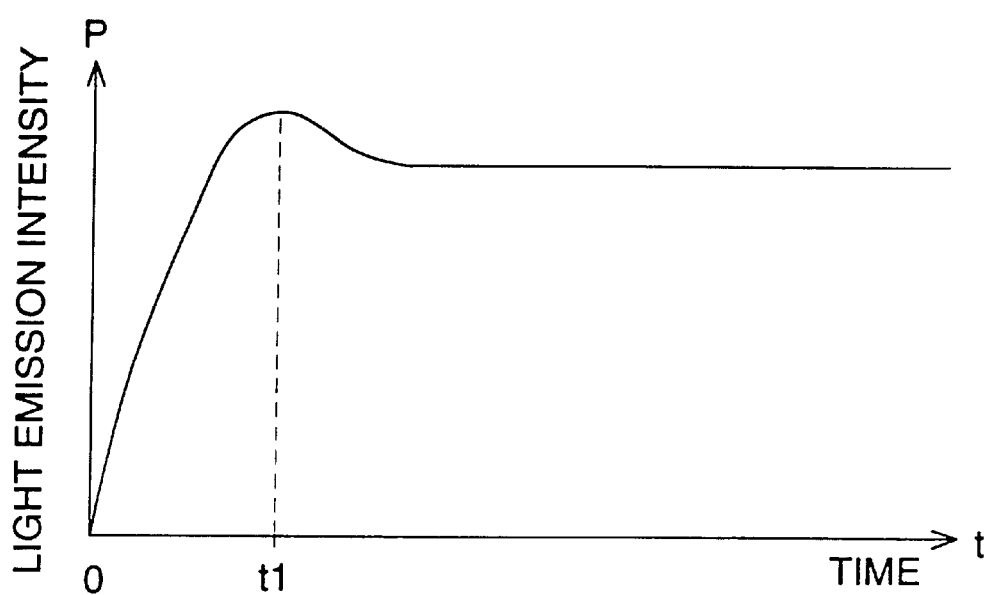
FIG. 20 is a graph showing the change with the passage of time of the light emission intensity of a laser diode.

In this image recording sequence, first, the control portion 100 detects if an instruction to record an image is given from external equipment (S1 in FIG. 18). If an instruction to record an image is given (YES in S1 in FIG. 18), the control portion 100 executes the recording of the image (S4 in FIG. 18).

If no instruction to record an image is given(NO in S1 in FIG. 18), it is watched from the result of the measurement by the temperature sensor 1600 that the variation of the temperature in the neighborhood of the optical unit 32 (including the laser diodes 320, 321, the lens, the mirror, etc.) does not exceed the predetermined value ΔT from the temperature at the time of previous beam intensity correction (refer to FIG. 16) (S2 in FIG. 18). Further, the temperature variation can be obtained from the average of the temperature values up to present time and the measured temperature value at present time.

As for the predetermined temperature variation ΔT in this case, it is the temperature variation to be produced by the variation of the environmental temperature etc., and it is set beforehand a value (for example, 5° C.) of a degree such that some variation is produced in the laser power.

If the temperature variation has not reached to this predetermined value ΔT (NO in S2 in FIG. 18), the procedure returns to the step waiting for an instruction to record an image from external equipment (S1 in FIG. 18).

On the other hand, if the temperature variation has reached to or exceeded the predetermined value ΔT (YES in S2 in FIG. 18), the intensity of the laser beam from the optical unit 32 is measured by the measuring portion 71, and the adjustment to make the intensity of the laser beam have the predetermined value. In the case of FIG. 19, after the temperature has reached to an approximately constant level TA, the temperature variation not less than ΔT is produced owing to the variation of the environmental temperature etc. That is, the adjustment of the laser power is made at the timing when such variation has been detected.

In this case, first, the predetermined driving current is supplied from the LD driver D320, D321 to the optical unit 32, and the intensity of the laser beam at that time is measured by the measuring portion 71. Then, the control portion 100, having received the result of the measurement in the measuring portion 71, obtains the driving current to make the intensity of the laser beam have the predetermined value with reference to the LUT 205, and gives an instruction to correct the driving current to the LD driver D320, D321 (S3 in FIG. 18). By repeating such a feed-back process, the control portion 100 completes the process for adjusting the laser power at the timing when the laser beam having the predetermined intensity is obtained from the optical unit 32. Then, if this adjustment of the laser power is completed, the procedure returns to the step waiting for an instruction to rerecord an image from external equipment (S1 in FIG. 18).

In addition, in the above flow chart, if any recording of an image is being done at the timing when the temperature variation has reached to or exceeded the predetermined value ΔT, the adjustment of the laser power will be done immediately after the recording of the image is finished (S2 and S3 in FIG. 18).

As explained in the above, by making the adjustment of the laser power at the timing when the temperature variation has reached to or exceeded a predetermined value ΔT, a constant quantity of light can be applied to a recording material regardless of deviation, expansion and contraction of the optical system. Owing to this, even though the light emission intensity is brought into a state different from that given by the laser power adjustment at the time of turning-on of the power source from several kinds of causes, it is kept back in a correct state by the adjustment made at the temperature in practical use.

Further, in the explanation given in the above, the adjustment is made at the temperature variation equal to or more than the predetermined value ΔT, but it is possible for this temperature variation value ΔT to be changed. That is, it is also possible that the above-mentioned temperature variation value ΔT is set or changed from the touch panel 12.

In the image recording apparatus of the examples of the embodiment of this invention, the adjustment of the laser power can be made on the basis of any one timing among the above-described measurement timings (1) to (4), or the adjustment of the laser power may be made on the basis of combination of arbitrary plural timings of (1) to (4).

As has been explained in detail, according to the timing of measuring the beam intensity in this invention, the effects as shown in the following can be obtained:

(1) The timing when the light emission intensity of the recording light source is unstable can be avoided, and it becomes possible for the recording light source to keep a light emission of the predetermined intensity, because the intensity of the laser beams is measured by the intensity measuring means and the intensity of the laser beams of the recording light source is adjusted after the initial operations and the predetermined warming-up process are completed.

(2) Regarding the period of time of the predetermined warming-up process after the initial operations, it is possible to set and change it. Therefore, the timing to make the adjustment of the light emission intensity can be set in accordance with the environment of using, the use, and the characteristics of the light source.

(3) The adjustment of the light emission intensity can be made at a timing other than the timing when the light emission intensity of the recording light source is unstable, and further, it becomes possible for the recording light source to keep a light emission of the predetermined intensity for a long time, because the intensity of the laser beams is measured by the intensity measuring means and the intensity of the laser beams of the recording light source is adjusted every time after the predetermined period of time has passed during the operation of the image recording apparatus.

(4) The intensity of the laser beam is measured by the intensity measuring means every time after the predetermined period of time has passed during the operation of the image recording apparatus; regarding the predetermined period of time, it is possible to set and change it. Therefore, the timing to make the adjustment of the light emission intensity can be set in accordance with the environment of using, the use, and the characteristics of the light source.

(5) It is possible to cope with the deviation of the optical system and the temperature drift of the light source owing to the temperature variation, and it become, possible for the recording light source to keep a light emission of the predetermined intensity, because the intensity of the laser beams is measured by the intensity measuring means and the intensity of the laser beams of the recording light source is adjusted, at the timing when the temperature in the neighborhood of the recording light source of the image recording apparatus has reached to the predetermined value.

(6) The intensity of the laser beam is measured by the intensity measuring means at the timing when the temperature in the neighborhood of the recording light has reached to the predetermined value during the operation of the image recording apparatus; regarding the predetermined temperature value, it is possible to set and change it. Therefore, the timing to make the adjustment of the light emission intensity can be set in accordance with the environment of using, the use, and the characteristics of the light source.

(7) It is possible to cope with the deviation of the optical system and the temperature drift of the light source owing to the temperature variation, and it becomes possible for the recording light source to keep a light emission of the predetermined intensity for a long time, because the intensity of the laser beams is measured by the intensity measuring means and the intensity of the laser beams of the recording light source is adjusted, at the timing when the temperature variation in the neighborhood of the recording light source of the image recording apparatus has reached to or exceeded the predetermined value.

(8) The intensity of the laser beam is measured by the intensity measuring means at the timing when the temperature variation in the neighborhood of the recording light has reached to or exceeded the predetermined value during the operation of the image recording apparatus; regarding the predetermined temperature variation value, it is possible to set and change it. Therefore, the timing to make the adjustment of the light emission intensity can be set in accordance with the environment of using, the use, and the characteristics of the light source.

What is claimed is:

1. An image recording apparatus, comprising:
   an optical unit having a plurality of laser diodes that are aligned to emit plural aligned beams, and a reducing lens system that reduces a size of the plural aligned beams and focuses the plural reduced aligned beams on a recording material;
   a driving circuit that drives the plurality of laser diodes in accordance with image output signals by applying a predetermined first bias signal to each of the plurality of laser diodes when an image is recorded on the recording material; and
   a beam intensity measuring element that measures a beam intensity of each of the plural reduced aligned beams while the driving circuit drives the plurality of laser diodes in accordance with a test signal;
   wherein the beam intensity measuring element has a beam receiving surface adapted to receive simultaneously at least two beams of the plural reduced aligned beams; and
   wherein when the beam intensity measuring element measures the beam intensity of a given one of the reduced aligned beams that is emitted from a target diode selected from among the plurality of laser diodes, the driving circuit drives only the target diode in accordance with the test signal and switches the first bias signal to a second bias signal that is smaller than the first bias signal.

2. The image recording apparatus of claim 1, wherein when the beam intensity measuring element measures the beam intensity of the reduced aligned beam emitted from the target laser diode, the driving circuit applies the second bias signal, which is substantially zero, to another laser diode other than the target laser diode, and when an image is recorded on the recording material, the driving circuit switches to the first bias signal, which is at a level that causes emission of a beam.

3. The image recording apparatus of claim 1, wherein a distance between centers of neighboring two beams the beam receiving surface is smaller than a size of the beam receiving surface.

4. The image recording apparatus of claim 3, further comprising:
   means for scanning the recording material with the beams emitted by the optical unit.

5. The image recording apparatus of claim 1, wherein the beam intensity measuring element measures the beam intensity of each of the beams emitted from the plurality of laser diodes after a predetermined warm-up process has been completed.

6. The image recording apparatus of claim 1, wherein the beam intensity measuring element measures the beam intensity of each of the beams emitted from the plurality of laser diodes every time a predetermined time period has elapsed while the image recording apparatus is working.

7. The image recording apparatus of claim 1, further comprising:
   a temperature measuring element that measures a temperature at a position located at or close to the optical unit;
   wherein the beam intensity measuring element measures the beam intensity of each of the beams emitted from the plurality of laser diodes in accordance with the temperature measured by the temperature measuring element.

8. The image recording apparatus of claim 1, wherein the driving circuit comprises a correcting circuit that corrects image signals in accordance with the beam intensity measured by the beam intensity measuring element and that outputs the image output signals.

9. An image recording apparatus, comprising:
   an optical unit having a laser diode and a beam optical system that includes a lens for guiding a laser beam emitted from the laser diode and that forces the guided laser beam onto a recording material;
   a beam intensity measuring element located at a position corresponding to that of the recording material so as to measure a beam intensity of the beam emitted from the beam optical system;
   a temperature measuring element that measures a temperature at a position located at or close to the optical unit; and
   a controller that controls the beam intensity measuring element so as to measure the beam intensity of the laser beam when the temperature measured by the temperature measuring element becomes a predetermined temperature, and that adjusts the beam intensity of the laser beam emitted from the laser diode based on the measured beam intensity.

10. The image recording apparatus of claim 9, wherein the controller changeably sets the predetermined temperature.

11. The image recording apparatus of claim 9, wherein when a change in the temperature measured by the temperature measuring element becomes larger than a predetermined value, the controller controls the beam intensity measuring element so as to measure the beam intensity of the laser beam and adjusts the intensity of the laser beam emitted from the laser diode based on the measured beam intensity.

12. The image recording apparatus of claim 11, wherein the controller changeably sets the predetermined value.

* * * * *